US009729916B2

(12) United States Patent
Sheehan et al.

(10) Patent No.: US 9,729,916 B2
(45) Date of Patent: *Aug. 8, 2017

(54) THIRD PARTY DATA MATCHING FOR TARGETED ADVERTISING

(71) Applicant: INVIDI TECHNOLOGIES CORPORATION, Princeton, NJ (US)

(72) Inventors: Patrick M. Sheehan, Jamison, PA (US); Bruce J. Anderson, Chesterfield, NJ (US); Daniel C. Wilson, Edmonton (CA); Alden Lloyd Peterson, II, New Providence, NJ (US); Michael Cristofalo, Doylestown, PA (US)

(73) Assignee: INVIDI TECHNOLOGIES CORPORATION, Princeton, NJ (US)

( * ) Notice: Subject to any disclaimer, the term of this patent is extended or adjusted under 35 U.S.C. 154(b) by 339 days.

This patent is subject to a terminal disclaimer.

(21) Appl. No.: 13/870,870

(22) Filed: Apr. 25, 2013

(65) Prior Publication Data

US 2013/0276027 A1    Oct. 17, 2013

Related U.S. Application Data

(63) Continuation of application No. 12/536,646, filed on Aug. 9, 2009, now abandoned, and a continuation of
(Continued)

(51) Int. Cl.
*H04N 7/10*    (2006.01)
*H04N 21/435*    (2011.01)
(Continued)

(52) U.S. Cl.
CPC ....... *H04N 21/435* (2013.01); *H04N 7/17336* (2013.01); *H04N 21/2389* (2013.01);
(Continued)

(58) Field of Classification Search
USPC ......................................................... 725/35
See application file for complete search history.

(56) References Cited

U.S. PATENT DOCUMENTS

| 4,264,925 A | 4/1981 | Freeman et al. |
| 4,331,974 A | 5/1982 | Cogswell et al. |

(Continued)

FOREIGN PATENT DOCUMENTS

| EP | 0930784 | 6/2001 |
| WO | WO9921338 | 4/1999 |

(Continued)

*Primary Examiner* — Junior Mendoza
(74) *Attorney, Agent, or Firm* — Marsh Fischmann & Breyfogle LLP

(57) ABSTRACT

A broadcast targeting system is provided where third party database information is utilized in conjunction with broadcast network client information to identify households within the broadcast network including one or more desired recipients of targeted assets. In instances where a user equipment device of the targeted household includes multiple users (i.e., a multiple-user device), use of third party data in conjunction with an indication of which household member is currently using the multiple user device (e.g., set top box, etc.) allows for more effectively delivering assets targeted to a specific member(s) of the household.

14 Claims, 10 Drawing Sheets

Related U.S. Application Data application No. 12/913,338, filed on Oct. 27, 2010, which is a continuation of application No. 12/022,209, filed on Jan. 8, 2008, now Pat. No. 7,489,477.

(60) Provisional application No. 61/086,566, filed on Aug. 6, 2008, provisional application No. 60/887,300, filed on Jan. 30, 2007.

(51) Int. Cl.

| | | |
|---|---|---|
| H04N 7/173 | (2011.01) | |
| H04N 21/2389 | (2011.01) | |
| H04N 21/25 | (2011.01) | |
| H04N 21/258 | (2011.01) | |
| H04N 21/266 | (2011.01) | |
| H04N 21/2668 | (2011.01) | |
| H04N 21/433 | (2011.01) | |
| H04N 21/4385 | (2011.01) | |
| H04N 21/81 | (2011.01) | |

(52) U.S. Cl.
 CPC ..... *H04N 21/252* (2013.01); *H04N 21/25883* (2013.01); *H04N 21/2668* (2013.01); *H04N 21/26616* (2013.01); *H04N 21/4331* (2013.01); *H04N 21/4385* (2013.01); *H04N 21/812* (2013.01)

(56) References Cited

U.S. PATENT DOCUMENTS

| | | |
|---|---|---|
| 4,573,072 A | 2/1986 | Freeman |
| 4,602,279 A | 7/1986 | Freeman |
| 4,918,516 A | 4/1990 | Freeman |
| 5,099,319 A | 3/1992 | Esch et al. |
| 5,155,591 A | 10/1992 | Wachob |
| 5,231,494 A | 7/1993 | Wachob |
| 5,251,324 A | 10/1993 | McMullan, Jr. |
| 5,260,778 A | 11/1993 | Kauffman et al. |
| 5,283,639 A | 2/1994 | Esch et al. |
| 5,381,477 A | 1/1995 | Beyers, II et al. |
| 5,410,344 A | 4/1995 | Graves |
| 5,446,919 A | 8/1995 | Wilkins |
| 5,515,098 A | 5/1996 | Carles |
| 5,534,941 A | 7/1996 | Sie et al. |
| 5,534,944 A | 7/1996 | Egawa et al. |
| 5,537,586 A | 7/1996 | Amram et al. |
| 5,550,928 A | 8/1996 | Lu et al. |
| 5,585,858 A | 12/1996 | Harper et al. |
| 5,600,364 A | 2/1997 | Hendricks et al. |
| 5,600,366 A | 2/1997 | Schulman |
| 5,636,346 A | 6/1997 | Saxe |
| 5,652,615 A | 7/1997 | Bryant et al. |
| 5,661,516 A | 8/1997 | Carles |
| 5,661,519 A | 8/1997 | Franetzki |
| 5,682,195 A | 10/1997 | Hendricks |
| 5,724,521 A | 3/1998 | Dedrick |
| 5,740,549 A | 4/1998 | Reilly et al. |
| 5,754,939 A | 5/1998 | Herz et al. |
| 5,758,257 A | 5/1998 | Herz et al. |
| 5,774,170 A | 6/1998 | Hite et al. |
| 5,818,539 A | 10/1998 | Naimpally et al. |
| 5,838,678 A | 11/1998 | Davis et al. |
| 5,848,396 A | 12/1998 | Gerace |
| 5,859,660 A | 1/1999 | Perkins et al. |
| 5,872,588 A | 2/1999 | Aras et al. |
| 5,907,322 A | 5/1999 | Kelly et al. |
| 5,912,709 A | 6/1999 | Takahashi |
| 5,917,830 A | 6/1999 | Chen et al. |
| 5,918,014 A | 6/1999 | Robinson |
| 5,948,061 A | 9/1999 | Merriman et al. |
| 5,982,436 A | 11/1999 | Balakrishnan et al. |
| 5,991,735 A | 11/1999 | Gerace |
| 6,002,393 A | 12/1999 | Hite et al. |
| 6,029,045 A | 2/2000 | Picco et al. |
| 6,049,569 A | 4/2000 | Radha et al. |
| 6,067,303 A | 5/2000 | Aaker et al. |
| 6,088,396 A | 7/2000 | Takahashi |
| 6,088,722 A | 7/2000 | Herz et al. |
| 6,111,896 A | 8/2000 | Slattery et al. |
| 6,151,443 A | 11/2000 | Gable et al. |
| 6,154,496 A | 11/2000 | Radha |
| 6,181,334 B1 | 1/2001 | Freeman et al. |
| 6,195,368 B1 | 2/2001 | Gratacap |
| 6,204,843 B1 | 3/2001 | Freeman et al. |
| 6,208,691 B1 | 3/2001 | Balakrishnan et al. |
| 6,216,129 B1 | 4/2001 | Eldering |
| 6,246,701 B1 | 6/2001 | Slattery et al. |
| 6,252,873 B1 | 6/2001 | Vines |
| 6,269,120 B1 | 7/2001 | Boice et al. |
| 6,286,140 B1 | 9/2001 | Ivanyi |
| 6,298,348 B1 | 10/2001 | Eldering |
| 6,324,519 B1* | 11/2001 | Eldering .............. 705/14.66 |
| 6,353,929 B1 | 3/2002 | Houston |
| 6,418,169 B1 | 7/2002 | Datari |
| 6,438,752 B1 | 8/2002 | McClard |
| 6,446,261 B1 | 9/2002 | Rosser |
| 6,457,010 B1 | 9/2002 | Eldering et al. |
| 6,463,585 B1 | 10/2002 | Hendricks et al. |
| 6,487,721 B1 | 11/2002 | Safadi |
| 6,560,578 B2 | 5/2003 | Eldering |
| 6,615,039 B1 | 9/2003 | Eldering |
| 6,637,028 B1 | 10/2003 | Voyticky et al. |
| 6,684,194 B1 | 1/2004 | Eldering et al. |
| 6,698,020 B1 | 2/2004 | Zigmond et al. |
| 6,704,930 B1 | 3/2004 | Eldering et al. |
| 6,708,335 B1 | 3/2004 | Ozer et al. |
| 6,714,917 B1 | 3/2004 | Eldering et al. |
| 6,820,277 B1 | 11/2004 | Eldering et al. |
| 7,003,792 B1 | 2/2006 | Yuen |
| 7,039,932 B2 | 5/2006 | Eldering et al. |
| 7,100,183 B2 | 8/2006 | Kunkel et al. |
| 7,146,627 B1 | 12/2006 | Ismail et al. |
| 7,331,057 B2 | 2/2008 | Eldering et al. |
| 7,849,477 B2* | 12/2010 | Cristofalo et al. .............. 725/34 |
| 2001/0025245 A1 | 9/2001 | Flickinger et al. |
| 2001/0032333 A1 | 10/2001 | Flickinger et al. |
| 2001/0049620 A1 | 12/2001 | Blasko |
| 2002/0013943 A1 | 1/2002 | Haberman et al. |
| 2002/0016731 A1 | 2/2002 | Kupersmit |
| 2002/0026638 A1 | 2/2002 | Eldering et al. |
| 2002/0032626 A1 | 3/2002 | DeWolf |
| 2002/0049727 A1 | 4/2002 | Rothkopf |
| 2002/0049968 A1 | 4/2002 | Wilson et al. |
| 2002/0053077 A1 | 5/2002 | Shah-Nazaroff et al. |
| 2002/0056107 A1 | 5/2002 | Schlack |
| 2002/0059584 A1 | 5/2002 | Ferman et al. |
| 2002/0072966 A1 | 6/2002 | Eldering et al. |
| 2002/0083435 A1 | 6/2002 | Blasko et al. |
| 2002/0083439 A1 | 6/2002 | Eldering et al. |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0092019 A1 | 7/2002 | Marcus |
| 2002/0099611 A1 | 7/2002 | De Souza et al. |
| 2002/0111154 A1 | 8/2002 | Eldering et al. |
| 2002/0111172 A1 | 8/2002 | DeWolf et al. |
| 2002/0122930 A1 | 9/2002 | Shimizu et al. |
| 2002/0123928 A1 | 9/2002 | Schlack et al. |
| 2002/0129368 A1 | 9/2002 | Schlack et al. |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0166119 A1 | 11/2002 | Cristofalo |
| 2002/0178445 A1 | 11/2002 | Eldering |
| 2002/0178447 A1 | 11/2002 | Plotnick et al. |
| 2002/0184047 A1 | 12/2002 | Plotnick et al. |

(56) References Cited

U.S. PATENT DOCUMENTS

| | | |
|---|---|---|
| 2002/0184130 A1 | 12/2002 | Blasko |
| 2002/0194058 A1 | 12/2002 | Eldering |
| 2003/0004810 A1 | 1/2003 | Eldering |
| 2003/0005437 A1 | 1/2003 | Feuer et al. |
| 2003/0005465 A1 | 1/2003 | Connelly |
| 2003/0037333 A1 | 2/2003 | Ghashghai et al. |
| 2003/0045957 A1 | 3/2003 | Habermann et al. |
| 2003/0067554 A1 | 4/2003 | Klarfeld et al. |
| 2003/0093792 A1 | 5/2003 | Labeeb et al. |
| 2003/0097299 A1 | 5/2003 | O'Kane |
| 2003/0101454 A1 | 5/2003 | Ozer et al. |
| 2003/0105831 A1 | 6/2003 | O'Kane et al. |
| 2003/0106070 A1 | 6/2003 | Saam |
| 2003/0110171 A1 | 6/2003 | Ozer et al. |
| 2003/0115318 A1 | 6/2003 | Wueste |
| 2003/0142689 A1 | 7/2003 | Haberman et al. |
| 2003/0149975 A1 | 8/2003 | Eldering et al. |
| 2003/0200336 A1 | 10/2003 | Pal et al. |
| 2003/0220100 A1 | 11/2003 | McElhatten et al. |
| 2003/0226142 A1 | 12/2003 | Rand |
| 2004/0003118 A1 | 1/2004 | Brown et al. |
| 2004/0003398 A1 | 1/2004 | Donian et al. |
| 2004/0015984 A1 | 1/2004 | Yamamoto et al. |
| 2004/0015986 A1 | 1/2004 | Carver et al. |
| 2004/0045020 A1 | 3/2004 | Witt et al. |
| 2004/0117257 A1 | 6/2004 | Haberman |
| 2004/0158858 A1 | 8/2004 | Paxton et al. |
| 2004/0181818 A1 | 9/2004 | Heyner et al. |
| 2004/0220893 A1 | 11/2004 | Spivack et al. |
| 2004/0243470 A1 | 12/2004 | Ozer et al. |
| 2004/0243623 A1 | 12/2004 | Ozer et al. |
| 2005/0021398 A1 | 1/2005 | McCleskey et al. |
| 2005/0028207 A1 | 2/2005 | Finseth et al. |
| 2005/0039205 A1 | 2/2005 | Riedl |
| 2005/0080846 A1 | 4/2005 | McCleskey et al. |
| 2005/0097599 A1 | 5/2005 | Plotnick et al. |
| 2005/0193410 A1 | 9/2005 | Eldering et al. |
| 2005/0204381 A1 | 9/2005 | Ludvig et al. |
| 2005/0228806 A1 | 10/2005 | Haberman |
| 2005/0234992 A1 | 10/2005 | Haberman |
| 2005/0283796 A1 | 12/2005 | Flickinger |
| 2006/0184977 A1 | 8/2006 | Mueller |
| 2006/0287915 A1* | 12/2006 | Boulet et al. .................. 705/14 |
| 2006/0293954 A1 | 12/2006 | Anderson et al. |
| 2007/0261072 A1 | 11/2007 | Boulet et al. |
| 2007/0266400 A1 | 11/2007 | Rogers et al. |
| 2008/0184289 A1 | 7/2008 | Cristofalo et al. |
| 2010/0324992 A1 | 12/2010 | Birch |
| 2011/0041151 A1* | 2/2011 | Cristofalo et al. ............. 725/35 |
| 2012/0089996 A1 | 4/2012 | Ramer et al. |

FOREIGN PATENT DOCUMENTS

| | | |
|---|---|---|
| WO | WO9946708 | 9/1999 |
| WO | WO0017775 | 3/2000 |
| WO | WO0033228 | 6/2000 |
| WO | WO0033233 | 6/2000 |
| WO | WO0117250 | 3/2001 |
| WO | WO0147156 | 6/2001 |

\* cited by examiner

THIRD PARTY DATA MATCHING FOR TARGETED ADVERTISING

CROSS-REFERENCE TO RELATED APPLICATION

This application is a continuation of U.S. application Ser. No. 12/536,646 having a filing date of Aug. 6, 2009 and which claims priority under 35 U.S.C. 119 to U.S. Provisional Application No. 61/086,566 filed on Aug. 6, 2008 and is a continuation of U.S. application Ser. No. 12/913,338 having a filing date of Oct. 27, 2010 and which is a continuation of U.S. application Ser. No. 12/022,209 having a filing date of Jan. 30, 2008 and which claims priority under 35 U.S.C. 119 to U.S. Provisional Application No. 60/887,300 filed on Jan. 30, 2007, the contents of all of which are incorporated herein by reference in their entirety.

FIELD

Systems and methods presented herein relate to the provision of targeted assets via a network interface. In one arrangement, targeted assets are provided to individual households of a broadcast network based on database information associated with the individual households.

BACKGROUND

Broadcast network content or programming is commonly provided in conjunction with associated informational content or assets. These assets include advertisements, associated programming, public-service announcements, ad tags, trailers, weather or emergency notifications and a variety of other content, including paid and unpaid content. In this regard, assets providers (e.g., advertisers) who wish to convey information (e.g., advertisements) regarding services and/or products to users of the broadcast network often pay for the right to insert their information into programming of the broadcast network. For instance, advertisers may provide ad content to a network operator such that the ad content may be interleaved with broadcast network programming during one or more programming breaks. The delivery of such paid assets often subsidizes or covers the costs of the programming provided by the broadcast network. This may reduce or eliminate costs borne by the users of the broadcast network programming.

In order to achieve a better return on their investment, asset providers often try to target their assets to a selected audience that is believed to be interested in the goods or services of the asset provider. The case of advertisers on a cable television network is illustrative. For instance, an advertiser or a cable television network may target its ads to certain demographic groups based on, for example, geographic location, gender, age, income etc. Accordingly, once an advertiser has created an ad that is targeted to a desired group of viewers (e.g., targeted group) the advertiser may attempt to procure insertion times in the network programming when the targeted group is expected to be among the audience of the network programming.

Various asset targeting systems have been proposed in the context of targeting ads to individual households (e.g., targeted households) in a cable television network. In one implementation, an asset targeting system is capable of selecting ads for delivery to a particular household based on known information associated with that household. In this regard, various data repositories (i.e., third party databases) may contain information associated with, for example, purchasing information, demographic information, etc. associated with the individual household. Accordingly, this third party database information is utilized to select ads for delivery to the household that are of putative interest to members of the household. After delivery, these ads can be stored by a user equipment device (e.g., set top box) of the household and inserted in a subsequent commercial spot.

SUMMARY

In view of the above, the inventors of the current systems and methods (i.e., utilities) have recognized that, in many instances, household targeting may not result in a desired level of granularity for asset delivery purposes. More specifically, it has been recognized that a majority of households include multiple members and these members are often demographically diverse. For instance, household members may form a family having a father, mother, adolescent child and a young child. Accordingly, assets targeted to the father may not be of interest to any of the other members of the household. Likewise, delivery of an asset targeted to the father while the father is not present results in both a missed asset impression for the father as well as a missed asset presentation opportunity for another member(s) of the household.

Accordingly, the present inventors have recognized that in instances where a user equipment device of a household includes multiple users (i.e., a multiple-user device), use of third party data in conjunction with an indication of which household member is currently using the multiple user device (e.g., set top box, etc.) may allow for more effectively selecting and delivering assets targeted to a member(s) or desired recipient of the household.

According to a first aspect, a system and method (i.e., utility) is presented for use in targeting broadcast network content (e.g., assets) wherein content is targeted to one or more desired recipients of an individual household, which may include multiple household members. The utility includes receiving, at a network platform, an asset dissemination request for an asset. The asset dissemination request includes household targeting criteria for the asset. The utility identifies network households that comply with the household targeting criteria for the asset. Once such network households are identified, the asset and at least one household member criteria is delivered via a network interface to the identified network households. Accordingly, user equipment device at each of the network households may utilize the household member criteria for outputting the asset upon identifying a putative presence of a household member complying with the household member criteria.

Generally, the process of identifying network households includes accessing third party database information in order to identify households complying with household targeting criteria. In this regard and as will be discussed herein, household targeting criteria may include constraints regarding household demographics, geography and/or household member composition. In further arrangements, asset providers may provide information (e.g., lists) of specific intended recipients. Such asset provider recipient information may be very detailed. For instance, an auto manufacturer may have detailed information for their previous customers. Accordingly, this information may be utilized for targeting assets to those previous customers. In a further arrangement, the system operator may provide additional information about their subscribers. For instance, a cable operator may identify subscribers that receive particular kinds of service—such as high definition television or VOIP telephony services. However, it will be appreciated that such desired recipient information without the ability to correlate that information with the network locations of those recipients may be of limited value for use with targeting assets. Accordingly, the present utility allows such desired recipient information to be utilized in conjunction with third party database information and/or network customer information to provide targeted assets to the network households of the desired recipients and allow the asset to be delivered to the desired household member.

The utility is operative to access third party database information to identify households that comply with the household and/or desired recipient targeting criteria. The utility is then operative to correlate identified households that meet the household targeting criteria with network households. As will be appreciated, not all households identified via the third party database information may be serviced by the network. In any case, use of customer database information allows for correlating complying households with network households. Furthermore, customer database information allows for obtaining network addresses for those network households. Accordingly, the assets may be delivered to each of the network addresses along with household member criteria, which may be individualized for each network household.

Delivery of the asset and a household member criteria allows for user equipment devices at the network households to deliver the asset to a particular member of the household. In this regard, asset providers may provide the household member criteria. Alternatively, the household member criteria may be determined by the utility. For instance, if an asset is to be disseminated to doctors within a geographic area, third party database information and/or customer information may be utilized to find network households including doctors within the geographic area. However, the doctors may be expected to vary in gender and age between the network households. Accordingly, different household member criteria may be determined and utilized to effectuate delivery to the appropriate person within each network household.

Generally, third party data information may be obtained from any information repository, including, without limitation, data management companies and public/governmental databases. This information may include purchasing information (e.g., credit card purchases or reports from customer loyalty cards), credit information, household composition, segmentation model clusters, and/or information about individual household members. Such information may be gathered from various sources including, without limitation, private databases and/or public databases such as DMV databases which may provide detailed information about individual persons, real estate records which may provide specific information about the home associated with the network address (e.g., presence/absence of swimming pool, 3-car garages, etc.). Additional information databases may include information regarding interests or associations of individual members of the household. For instance, public database registrations of various associations (e.g., bar associations, medical licensing boards, etc.) may include information regarding occupations of individual members of a household. Such information may be utilized to determine actual members, putative members and/or demographics of a household. Accordingly, once putative members and/or demographics of the household are identified, one or more assets may be selected for delivery to that household and/or for delivery to a specific member of the household.

In order to correlate third party data and/or asset provider recipient information with individual households, network customer database information may be obtained. Such network customer database information may be obtained that includes customer specific information associated with individual households. Such information may include, without limitation, address/location of individual network households and/or one or more names of individuals associated with the network household.

In another aspect, a system and method is provided for representing household attributes and/or asset targeting criteria in a simplified form. In this aspect, attributes of a household or an asset may be defined as an attribute vector. In this regard, the attributes may be mathematically defined by their entries within a vector. Furthermore, such vector entries may be Boolean and/or integer values. As will be appreciated, utilization of such Boolean or integer values allows for creating a detailed attribute vector having a small data size. Such attribute vectors may be generated utilizing third-party data information and may include multiple (e.g., thousands) of potential attributes. This may allow for generating compact attribute descriptions of households that may include very detailed information regarding the household. Likewise, the compact nature of the vector allows for the attribute vectors to be distributed to their individual households or utilized by head end systems to match the household attributes with targeted asset criteria.

According to another aspect, a method for dynamically inserting assets into a content stream for delivery to network households and to desired members within the household is provided. The utility includes receiving an asset dissemination request for an asset where the asset dissemination request includes household asset targeting criteria. The utility is operative to identify households complying with the asset targeting criteria. Upon receiving a signal from a first of the identified households indicating that said first network household is outputting network content, the utility is operative to determine a putative identity of the household member, or members, receiving the network content. Once the determination is made that a current user/putative household member is a desired recipient of the asset, the asset may be delivered to the household and output to the current user or users.

In one arrangement, receiving a signal from the user equipment device further includes receiving a signal indicating the identity of a putative current user. In this regard, user equipment devices of the network households may be operative to identify a current user and report such information to the utility for asset selection. In another arrangement, the utility may utilize viewership monitoring information associated with, for example, the network as a whole and/or individual households within the network to determine the putative identity of a current network user. In one arrangement, actual viewing history for individual network households may be accessible. Such actual usage history may be correlated with statistical usage patterns to determine the likely age, gender, etc. of a current user. Accordingly, a putative determination of the identity of the current user may be determined. In another arrangement, statistical data alone may be utilized to determine the putative identity of a current user of a targeted network household. In this regard, ratings information may be utilized to provide an indication of which member of the household is currently receiving network content.

Determining a putative identity of a current network user of a network household may be performed by generating household profiles based on information associated with third party databases, customer databases or other information repositories. In this regard, putative members of the household may be identified. Such information may be further combined with statistical or actual network usage patterns to provide an indication of which household member is a current user.

In a further aspect, asset delivery information provided by network households may be utilized to correlate demographic information to assets consumed by network users. In such a utility, asset delivery notifications (ADNs) may be received via a network interface from one or more network households. Such asset delivery notifications may include the identification of one or more assets output to users of the network household as well as the network address associated with the ADN. Accordingly, this network address may be correlated to household information. Such correlation may be performed utilizing customer information databases and/or third party databases. The third party database information may be accessed to provide demographic information associated with network users of the network household that receives a particular asset. Accordingly, for a given asset a plurality of ADNs may be matched to a plurality of different network households to provide a general profile of the network users who consumed a particular asset. Such a profile may be summarized and provided to asset providers such that they may use this information for future targeting and/or asset generation purposes. It will be appreciated that any personal or identifying information may be removed from such information prior to providing the same to asset providers.

In a further aspect, asset delivery information may be used to anti-correlate demographics to assets which are actively rejected by network viewers. In such a utility ADNs may be extended to include information about "active tune aways" wherein a network viewer views only a fraction of the start of an asset and then changes channels. The ADN may contain the fraction of the asset that was viewed, and whenever that fraction falls below a certain threshold that asset can be considered to be rejected. The third party database information may be accessed to provide a demographics for network users who receive, but reject, the asset. Accordingly, for a given asset a plurality of ADNs may be matched to a plurality of different network households to provide a general profile of network users that reject the asset. In the same way that asset consumption reports may be provided to network users, asset rejection reports may likewise be provided. These rejection reports may prove invaluable to asset providers. As an example, suppose that an asset provider has targeted a specific asset at men between the ages of 18 and 54. A report that men between the ages of 35 and 54 routine consume the assets but men between the ages of 18 and 34 actively reject the assets could lead to the development of an asset that better appeals to the 18 to 34 age range.

According to another aspect, a system and method (i.e., utility) is provided for improving delivery of an asset targeted to a current network user. Such utility may be implemented at a user equipment device of a household in a broadcast network. Initially, the user equipment device may receive assets addressed specifically to the household and which target one or more members of the household. Such assets may include household member criteria including a member of the household to which the asset is targeted. Subsequently, the user equipment device may receive an input from a user of the user equipment device (e.g., a household member). Based on this input, the utility may identify one of the members of the household as being the current user of the user equipment device. Accordingly, the utility may select assets for delivery based on the identified current user of the user equipment device.

In one arrangement, the utility may receive putative household member information. That is, processed third-party data regarding putative members of a household may be provided from the broadcast network to user equipment device of the household. Alternatively, household membership information associated with actual/identified members of the household may be provided to the user equipment device. Accordingly, the user equipment device may utilize one or more stored algorithms to select amongst, for example, predetermined classification parameters associated with members of the household. For instance, based on a click stream received by user input device, the utility may determine which of the household members is most likely currently receiving network content from the user equipment device. Accordingly, once the current user is identified, assets may be selected (e.g., from storage, from asset channels, etc.) that are targeted to the current user.

DETAILED DESCRIPTION

The present invention relates to various structure and functionality for delivery of targeted assets in a communications network, as well as associated business methods. Such targeted assets are typically provided with network content. In this regard, such network or broadcast content may be delivered in a variety of networks including, for example, cable and satellite television networks, satellite radio networks, IP networks used for multicasting content and networks used for podcasts or telephony broadcasts/multicasts. Content may also be broadcast over the airwaves though, as will be understood from the description below, certain aspects of the invention may make use of bi-directional communication channels which are not readily available, for example, in connection with conventional airwave based televisions or radios (i.e., such communication would involve supplemental communication systems). In various contexts, the content may be consumed in real time or stored for subsequent consumption. Thus, while specific examples are provided below in the context of a cable television network for purposes of illustration, it will be appreciated that the invention is not limited to such contexts but, rather, has application to a variety of networks and transmission modes.

The targeted assets may include any type of asset that is desired to be targeted to network users. It is noted that such targeted assets may include, without limitation, advertisements, internal marketing (e.g., information about network promotions, scheduling or upcoming events), public service announcements, weather or emergency information, or programming. The targeted assets may be independent or included in a content stream with other assets such as untargeted network programming. In the latter case, the targeted assets may be interspersed/interleaved with untargeted programming (e.g., provided during programming breaks) or may otherwise be combined with the programming. In the description below, specific examples are provided in the context of targeted assets provided during breaks in television programming. While this is an important commercial implementation of the invention, it will be appreciated that the invention has broader application. Thus, distinctions below between "programming" and "assets" such as advertising should not be understood as limiting the types of content that may be targeted or the contexts in which such content may be provided.

Figure 1:
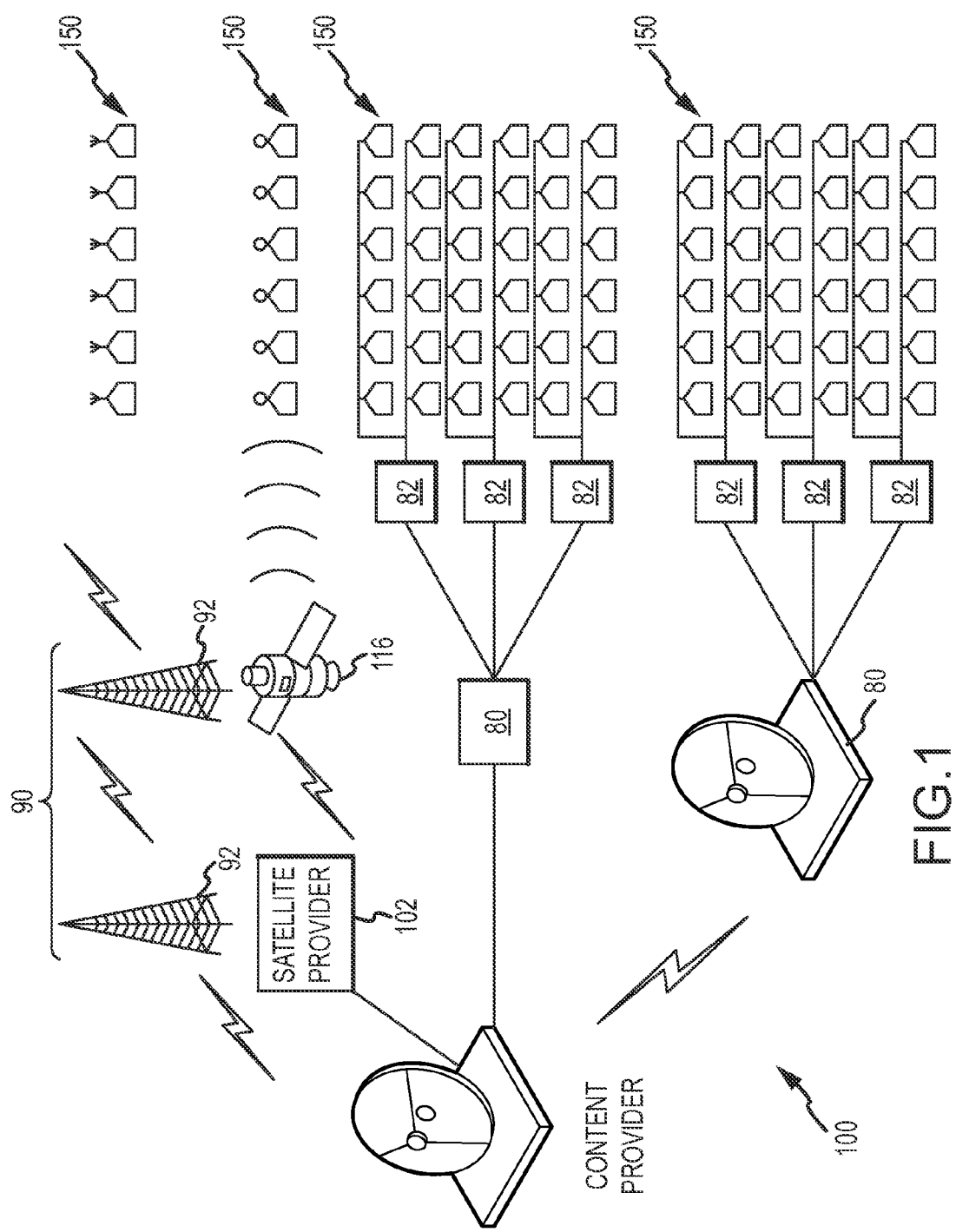
FIG. 1 illustrates a broadcast network.

For purposes of illustration, the invention is described below in the context of cable television network implementations. Components of exemplary cable television networks 100 are depicted in FIG. 1 where different modalities are utilized to deliver broadcast content to network users. In the illustrated network 100, broadcast content is distributed to network users via a plurality of network platforms 90. Such network platforms may vary by region, broadcast network and/or nationality. In one arrangement, the network platforms include repeater stations 92 or satellites 116 that receive broadcast content (e.g., directly, over-air and/or via satellite transmissions) and repeat broadcast the content stream to network users/households 150. In another arrangement, the broadcast network provides broadcast content via a series of network platforms.

Such a series of network platforms may include regional/central network platforms as well local platforms. In a cable television network context, such regional/central network platforms may be represented by regional head ends 80. Each of the regional head ends may be operative to provide broadcast content (e.g., primary distribution) to a plurality of local head ends 82. Such local head ends 82 may then provide content (e.g., secondary distribution) to network users 150. The asset targeting functionality described herein may be implemented at one or more of the network platforms, regional/local head ends, etc.

Generally, the network platforms 90 process received content for transmission to network users. Among other things, the network platforms may be operative to amplify, convert and otherwise process the broadcast content signals as well as to combine the signals into a common cable for transmission to network users 150, e.g., individual households. The network platforms can also process signals from users in a variety of contexts. The network platforms may thus be thought of as the control centers or local control centers of the cable television network 100. It will also be appreciated that local head ends may also be operative to insert local content from local content providers (e.g., local television stations) and/or local asset providers. In any case, the broadcast signal is processed by user equipment devices of the network users, which may include a television, data terminal, a digital set top box, digital video recorder (DVR) or other terminal equipment. It will be appreciated that digital or analog signals may be involved in this regard.

Irrespective of the exact network configuration, users employ the network, and network operators derive revenue, based on delivery of desirable content or programming. The stakeholders in this regard include programming content providers, programming networks, asset providers such as network-wide advertisers (who may be the same as or different than the programming providers), delivery network operators such as Multiple Systems Operators (MSOs), local asset providers and users—or viewers in the case of television networks. All of these stakeholders have an interest in improved delivery of content including targeted asset delivery. For example, users can thereby be exposed to assets that are more likely of interest and can continue to have the costs of programming subsidized or wholly borne by asset providers. Asset providers can benefit from more effective asset delivery and greater return on their investment. Delivery network operators and asset providers can benefit from increased value of the network as an asset delivery mechanism and, thus, potentially enhanced revenues.

Historically, broadcast content from a programming network has included programming and interleaved assets, which asset providers have paid to have included with the programming of the programming network. These interleaved assets have been disseminated in a content stream along with the programming of the programming network. In addition, some programming networks have historically provided one or more cues within the content stream (e.g., programming and interleaved assets) to allow local network platforms to insert local assets (e.g., replace a default ad in a timeslot of the content stream with a local ad).

Pricing for asset delivery has primarily depended on the size of the viewing audience, though other factors have been factored in as well. One of those factors relates to the demographics of interest to the asset provider. In this regard, a given program will generally have a number of different ratings for different demographic categories. That is, the program generally has not only a household rating, which is measured against the universe of all households with televisions, but also a rating for different demographic categories (e.g., males 18-24), measured against the universe of all members of the category who have televisions. Thus, the program may have a rating of 1 (1%) overall and a rating of 2 (2%) for a particular category. Typically, when asset providers buy a time-slot, pricing is based on a rating or ratings for the categories of interest to the asset provider. Alternatively, time-slots may be sold on a fixed fee per spot basis; fees might be varied depending on the time of day, or a rough categorization of the size of audience. This results in significant inefficiencies due to poor matching of the audience to the desired demographics.

For example, even if ratings analysis indicates that a particular program has an audience comprised sixty percent of women, and women comprise the target audience for a particular asset, airing on that program will result in a forty percent mismatch. That is, forty percent of the users potentially reached may not be of interest to the asset provider. Moreover, ideally, targeted asset delivery would allow for targeting with a range of granularities. In instances where different assets may be targeted to different households or individual users within the households for a given time slot, the inefficiencies may be reduced.

Various asset targeting systems have been proposed in the context of targeting ads to individual households in a cable television network in order to provide assets better matched to the putative interests of the household. In one implementation, an asset targeting system is capable of delivering addressable assets. In such systems, commercial messages to be distributed over a television network contain embedded information identifying categories of recipients for each message. A server centrally located on the network selectively tags commercial messages with converter addresses of network subscribers satisfying the identifying categories. The commercial messages are then transmitted over the network for receipt and display by a television receiver connected to the addressed converters. Such asset targeting systems are described in U.S. Pat. Nos. 5,515,098 and 5,661,516, which are incorporated by reference herein.

The present invention provides targeted asset system implementations useful in the noted contexts while improving the delivery of targeted assets to individual users or members within targeted households. In the following description, an inventive targeted asset delivery system is initially set forth in the context of a forward-and-store architecture, which is one environment for implementing the system. However, it will be appreciated that various aspects of the invention can be implemented in other environments such as where real time communications exist between network households and the network.

Figure 2:
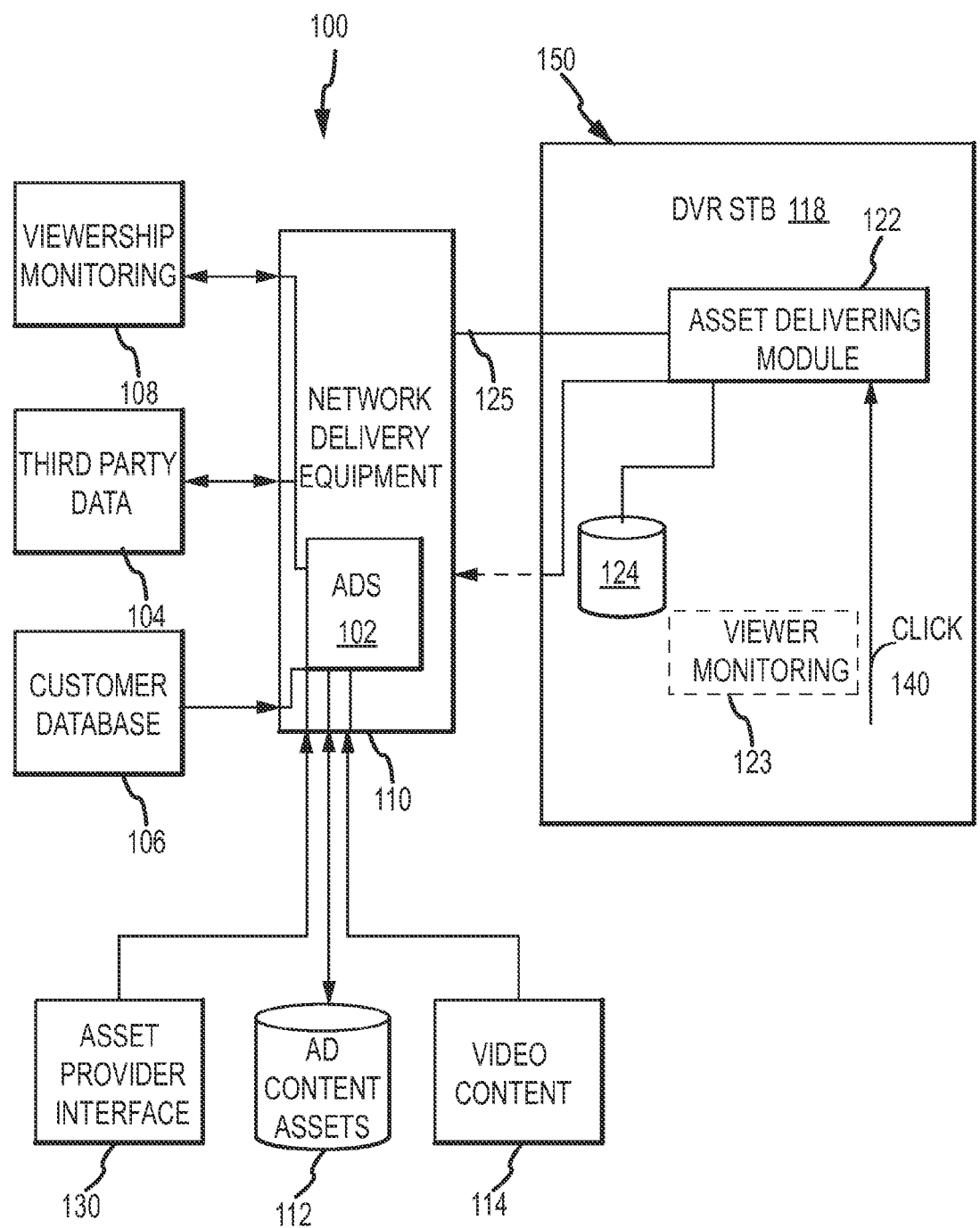
FIG. 2 illustrates one embodiment of a household targeting asset delivery system.

Referring to FIG. 2, a television network 100 implementing a targeted asset system in accordance with the present invention is illustrated. Network delivery equipment 110 is operative to broadcast data, including video content, ads and network data, to network households 150 using one or more network platforms as discussed above.

In the illustrated example, much of the functionality of the targeted asset system is implemented by an ad decision system (ADS) 102 associated with network delivery equipment 110. The ADS 102 is illustrated as a single platform that is incorporated in the network delivery equipment 110 of the broadcast network. However, it will be appreciated that functionality of the ADS 102 may be spread over multiple platforms or nodes within the broadcast network and/or within user equipment of individual households. Generally, the ADS 102 is operative for correlating assets dissemination requests received from an asset provider interface 130 with third party data 104 to identify prospective households including desired asset recipients (e.g., targeted individuals). In further arrangements, some of this functionality may be moved to the user equipment of individual households. However, in the present embodiment, the ADS 102 is operative to correlate any identified prospective households with corresponding network households 150. In this later regard, network customer information stored in a customer database 106 may be correlated with the information associated with the prospective households. Accordingly, the asset may be delivered to the household. In the present implementation, the asset is then output when there is an indication that the targeted individual is receiving network content.

The customer database 106 may include a variety of information regarding individual viewers or households, such as the address/location of the household, the name or names of network users (e.g., customer name) and/or demographic information regarding the users, etc. Such customer information is typically maintained and/or accumulated by delivery network operators. Further, these operators may augment this information using, for example, customer surveys, etc. By correlating the information of the prospective households (e.g., addresses, names, etc.) with network customer information, network households including desired recipients for a particular asset may be identified. Accordingly, assets targeted to the desired recipients may be disseminated to these identified network households. For instance, in an implementation where targeted assets are forwarded to individual set top boxes (STBs), such STBs may include individual addresses (e.g., MAC addresses).

Such addresses are typically contained within the customer database. Accordingly, an asset targeted to that network household may be addressed and delivered to a STB of the network household. In such an arrangement, the STB may be operative to insert the asset into network content (e.g., programming) at an appropriate time.

The ADS 102 may also incorporate a viewership-information database 108 that may provide statistical information based on general usage habits of network users and/or usage information content selections by individual users of a specific network household. In the former regard, statistical information may be obtained from, for example, media research entities (e.g., Nielsen ratings). In the latter regard, household usage information may be reported from the STB 118 of a network household via an interface 125 that may be the same as the interface through which broadcast content is received. Alternately, a separate interface may be utilized to report household usage information. Such a separate interface may include, without limitation, a Telco interface and/or an Internet interface. In any case, the viewership monitoring/information database 108 may be utilized to provide an indication of which member of a household is or is expected to be receiving network content from an STB, as is more fully discussed herein.

The network delivery equipment 110 also receives video inputs from various sources and asset 112 that may be transmitted to the network households 150. For example, video streams for multiple programming channels may be delivered to STBs 118 of the network households 150. In the cable television context of the present invention, the assets 112 may include ad options for insertion in any given commercial spot on any given ad supported programming channel. The assets 112 may further include metadata identifying the target audience/desired household recipient for each asset.

An asset provider interface 130 allows asset providers to provide assets to the ADS 110 and specify targeting criteria/constraints for those assets. The assets provided to the ADS 110 are stored in a repository/database 112 for subsequent delivery to appropriate network households. As discussed above and more fully below, the ADS 110 utilizes the targeting constraints, third party data, customer data and/or viewership information to identify appropriate network households to receive a particular asset. In the present embodiment, the asset providers may provide household targeting criteria/constraints such that the assets are only delivered to households complying with the characteristics desired by the asset provider. In addition, the asset provider may specify which member of a household is to receive the asset.

The third party database(s) 104 can provide very rich information regarding individuals which may be matched to network users. For instance, such third party databases include databases by entities such as, without limitation, Acxiom® who is a customer and data information management company and Experian$^{SM}$ whose principal line of business are credit services. Such entities offer a range of products and services including detailed information regarding individual people and consumers in general. For instance, such entities collect information on people, businesses, motor vehicles and insurance. They may also collect 'lifestyle' data from through, for example, on-line and off-line surveys.

Information collected by such entities often includes personal and/or household data (e.g., age, gender, race, education, etc.) that may be matched to network households and household members (e.g., by correlating/matching addresses, names etc). For instance, some data providers obtain department of motor vehicle (DMV) database information which may provide information regarding the name, home address, sex, height, weight, eyesight, etc. of a member of a network household. Likewise, real estate records may be accessible that may include, for example, home values, homes with swimming pools, homes with three car garages, home lenders, home equity, etc. Such real estate record may also provide at least at least ancillary information about, for example, household income. Automotive registration information may be available and include, for example, the type, number, value of automobiles registered to/associated with an individual or household. Purchasing behavior databases (e.g., credit card databases, grocery store value members, etc.) associated with individuals or households may include, without limitation, number and/or types of credit cards, products purchased, credit ranges etc. Association membership databases (e.g., medical boards, licensing agencies, bar associations, etc.) may also be accessible and provide information regarding, for example, occupations of household members. Further, it will be appreciated that certain asset providers may provide their own customer database information. By way of example and not limitation, a car manufacturer may provide information (e.g., names, last known addresses, etc) associated with previous buyers of their automobiles. This may allow the car manufacturer to provide advertising regarding, for example, new models or extended warranties to such previous buyers.

In summary, it will be appreciated that voluminous third party data and/or customer data exists which may be variously correlated to households of network customers. Based on any combination of this information, it may be possible to obtain actual and/or deduce putative information about individual members of a household. For instance, it may be possible to determine the actual membership and/or composition of a household (e.g., mother 36, nurse; father 42, contractor; two children, 6 and 8, girls etc.). That is, third party database information may be obtained and correlated to network households to identify, for example, occupations, purchasing information, personal interests, demographic information, etc. of members of a network household. This may allow for identifying products and/or services that are of interest to one or more of the individual members of the household. Likewise, the detailed third party information may also allow asset providers to specify the types of households and/or members of such households to which they want their assets disseminated.

As presented above and herein, the ADS 102 performs most of the third party data aggregation and subsequent correlation of household attributes with asset targeting constraints at the network level. That is, correlation of assets with particular households is done by the network, and the ads are subsequently delivered to those correlated households and/or the members of those households. However, in some instances, it may be desirable to move some of the functionality of the ADS system from the network level to the set top level. In such an arrangement, information may be provided to each household that allows a household to identify assets for the household. That is, rather correlating assets to households at the network level where assets are specifically addressed to particular households, some of the ADS functionality moves to the set top. This may allow sending out targeted assets to all set top boxes and allowing the set top boxes to download and/or store and output household appropriate assets. Accordingly, it will be appreciated that the discussion presented herein is applicable to both network ADS and set top ADS systems.

In either ADS arrangement, it may be desirable to have a compact representation of both the household data, which may be generated using detailed third party data, as well as the targeting criteria for broadcast assets. In the set top ADS arrangement, the set top boxes or digital set top boxes of a household may be operative to match detailed household data against detailed targeting criteria of mass distributed assets in order to ensure the appropriate assets are downloaded from the network for immediate presentation to household members or for storage and subsequent presentation to household members and/or specific household members. A compact representation of these characteristics also facilitates efficient matching of the household data to the targeting criteria. This is true if the ADS functionality is located in the network or at the set top.

While such household data and targeting criteria may be expressed in many different ways, one approach that may be taken is to use a system of predicate operators and Boolean logic to form an equation that expresses the household data and targeting criteria. In Boolean form, if an equation evaluates to true, then and only then, is the targeting criteria met. In simple form, predicate operators may take household attributes and constant values (e.g., as may be determined form third party data, customer surveys etc.) as operands and produce Boolean values of true or false as results. These predicate operators may be combined with AND, OR and NOT operations to form the expression of a targeting criteria. One method of expression is a traditional infix style notation that uses parentheses to dictate the order of operation, or it may use a prefix style notation or a postfix style representation (often referred to as reverse polish notation). These latter two are generally easier for a computer processor to parse and evaluate and therefore may be preferable for STB implementation.

In any system where the ADS functionality is performed using such Boolean functionality (e.g., by a network ADS or a STB ADS) the users of such a system (asset providers) would, of course, have to provide the desired targeting criteria. However, the users would not have to enter such criteria in the Boolean form or other specialized notation. Rather, the user may, for instance, use a graphical user interface (e.g., asset provider interface 130) to specify the desired combination of targeting attributes/criteria and the interface (or other network platform) translates the criteria into the proper notation, which may be further reduced to a computer representation. It will be appreciated that while this notation can be used in both network ADS and set-top ADS implementation, the notation may be very compact and therefore is particularly apt for the set-top ADS implementation.

In a simplified case an ADS system that uses only one unary predicate operator that takes an integer value that identifies a specific household attribute in a string or vector of Boolean values (i.e., household attribute vector) and returns corresponding value may be implemented. That is, a predicate operator that returns TRUE when given n and the nth value in the vector is TRUE and returns FALSE when the nth value is FALSE. For instance, supposing that there are five attribute categories of information about households and/or the people living in the households including: home owner(s), lease car, children under 12 present in household, cat owner(s), and dog owner(s). Boolean values of TRUE or FALSE for each of these household information items are generated for each household in the network. For instance, the household attribute vector for a single unmarried person with no children or pets who rents an apartment and owns his car would be (FALSE, FALSE, FALSE, FALSE, FALSE). A household where the house and car are owned, that has a 5 year old child and has a cat, but no dog would be represented as (TRUE, FALSE, TRUE, TRUE, FALSE). Referring to the exemplary predicate operator as BVAL (Boolean value) and number the vector entries from left to right starting with 1 then some examples of targeting criteria are:

| Targeting Criteria | Expression as Infix | Expression as Postfix |
| --- | --- | --- |
| Owns House and Leases Car | BVAL(1) AND BVAL(2) | 1 BVAL 2 BVAL AND |
| Children present and owns either a dog or a cat | BVAL(3) AND (BVAL(4) OR BVAL(5)) OR AND | 3 BVAL 4 BVAL 5 BVAL (BVAL(4) OR |
| Owns house and no children | BVAL(1) AND NOT (BVAL(3)) | 1 BVAL 3 BVAL NOT AND |

As will be appreciated such a system could easily be extended to thousands of household attributes. Such attributes could, for example, describe each individual identified within the household: male, 42, college education, income greater than 50,000, female 40, graduate degree, income greater than 70,000, etc. While being able to provide numerous attributes that could, but need not necessarily be identified, the size of the household attributes string or vector remains small. For instance, a 16,000 attribute string or vector may only require 2000 bytes of data. This small data size facilitates the provision of individual household attribute vectors to multiple households.

In another system, integer values for household attributes may be desirable (although it should be noted that by breaking an integer value down into its binary representation and associating TRUE and FALSE with 1 and 0 the previous system can be used to represent integer attributes). Returning to the examples above, where five attribute categories of information are set forth for households and/or the people living in the households include: home owner(s), lease car, children under 12 present in household, cat owner(s), and dog owner(s). Integer values of 1 (TRUE) or 0 (FALSE) for each of these household information items are generated for each household in the network. For instance, the household integer attribute string or vector for a single unmarried person with no children or pets who rents an apartment and owns his car would be: 0 0 0 0 0. A household where the house and car are owned, that has a 5 year old child and has a cat, but no dog would be: 1 0 1 1 0. Such a representation allows for generating a household attribute string or vector in an extremely compact manner.

In such a system, there may be two vectors associated with each household, one of Booleans and one of integers. Adding to this system a unary predicate operator IVAL (Integer value) that is the analog of BVAL, but rather returns the integer value of nth item from the vector of household integers. Finally adding a binary equality predicate operator that takes two integer operands (which may be either constants or IVAL predicate operators) and returns a Boolean value of TRUE if the two integers are the same and FALSE otherwise. Continuing the example above where the household information is augmented with two integer values: household income in dollars and 5 digit zip code; some example targeting criteria would be:

| Targeting Criteria | Expression INFIX | Expression POSTFIX |
| --- | --- | --- |
| Own house and Income = 100,000 | BVAL(1) AND EQ(IVAL(1), 100000) | 1 BVAL 1 IVAL 100000 EQ AND |
| In zip code 75240 or 75241 or 75242 | EQ(IVAL(2), 75240) OR EQ(IVAL(2), 75241) OR EQ(IVAL(2), 75242) | 2 IVAL 75240 EQ 2 IVAL 75241 EQ OR 2 IVAL 75242 EQ OR |

This last example shows that a comparison predicate may be useful. Several different predicate operators could be added and may include, for example, a binary "less than" predicate operator (abbreviated LT), which would return TRUE if and only if the first operand is less than the second operand, would be adequate for most applications. More comparison predicate operators may be added as a convenience but the single LT operator in combination with an equality operator allows all possible comparisons. For example, a less than or equal (LE) predicate operator which would return TRUE if and only if the first operand is less than or equal to the first operand may be implemented LT(x,C) or EQ(x,C) or more simply by changing the constant used in LT: LE(x,C) is the same as LT(x,C+1)) Consider the following examples:

| Targeting Criteria | Expression INFIX | Expression POSTFIX |
| --- | --- | --- |
| Own house and Income between 100,000 and 150,000 | BVAL(1) AND LT(99,000, IVAL(1)) AND LT(IVAL(1), 151000) | 1 BVAL 99000 1 IVAL LT AND 1 IVAL 151000 LT AND |
| In zip code 752xx | LT(75199, IVAL(2)) AND LT(IVAL(2), 75300) | 75199 2 IVAL LT 12IVAL 75300 LT AND |

The previous approaches may be simplified by redefining the predicate operators to accept indexes into the household value vectors as operands and requiring the predicate operators to fetch the appropriate value for use. The BVAL and IVAL operators are no longer required. Any constant values used in the evaluation will need to be stored in the value vectors. Using this approach a targeting expression such as BVAL(1) AND LT(99,000,IVAL(1)) AND LT(IVAL(1), 151000) becomes 1 AND LT(3, 1) AND LT(1,4) where the integer vector has been extended to include the constants 99,000 and 151,000 as the third and fourth elements respectively. Note that there is a type associated with the predicate operators and that type determines which value vector is accessed to retrieve the associated value. It is possible that an intermediate result may be of the incorrect type, in which case automatic conversion functions may be defined. For instance if a Boolean intermediate value occurs where an integer is expected then an automatic conversion of TRUE to 1 and FALSE to 0 would be a reasonable approach. This method can be applied in an analogous manner to the postfix expression method. This method has the advantage that the expressions are more compact. Once this framework is in place it is easy to augment the set of predicate operators. For instance, a common extension would be to add a set of arithmetic predicate operators that perform addition, subtract, multiplication, integer division, and remainder.

This mechanism can be used in for targeting advertising by arranging for an ADS or other platform in the network (e.g., a headend) to generate and download into each individual STB a set of household attribute strings or vectors of Booleans and/or integers that characterize that household. That is, an attribute template may be generated where each entry in the string or vector corresponds to one predetermined household attribute. For example, entry 350 may correspond to households having three-car garages, etc. In any case, such household attribute strings or vectors may be generated utilizing available third party data to populate such predetermined strings and thereby provide highly detailed yet compact household classifications that maybe used to match a household or members of the household with assets provided via a broadcast network. Further, the attribute strings or vectors may be periodically updated. Alternatively, the STBs may themselves generate or populate entries into the attribute strings or vectors. In such an arrangement, the STBs may include logic and/or programming that allows the STB to generate or populate an attribute strings or vector for the household. In this arrangement, the STB may receive third party data from the network. That is, the network may access a third party database to obtain information for a particular household and forward that information to a STB (or other user equipment device) of the household which then utilizes the data to generate/populate the string or vector. Further, the STBs may utilize user behavior (e.g., click stream data) to deduce one more values for implementation into the household strings or vectors.

Once an ADS platform in the network or the individual households have a household attribute string or vector, targeting criteria for an asset can be represented in a compact manner for use with the household attribute string or vector. In the former regard, the ADS platform can compare households to targeting constraints of assets and individually forward assets to matching households. In the later regard, each STB uses the attributes to evaluate each targeting criteria in a targeted asses in relation to their individual attribute strings or vectors to determine if the targeting criteria are met at that STB. Note that it is not necessary to transmit all known attributes (and/or constants) to the STB, only those criteria/attributes which will be actively used in targeting of a particular asset need be transmitted. The list of targeting expression may change from time to time, and thus the set of criteria/attributes may change from time to time.

In cases where the household attribute strings or vectors match the targeting constraints, the asset may be output to the household. However, it should be noted that such matching does not require perfect correspondence. As noted above, the household attribute strings or vectors may include thousands of potential attributes. Likewise, the targeting constraints may include multiple targeting attributes. The required match between the targeting constraints and the household attributes may be dictated by an asset provider. For instance, for an asset having ten (10) constraints, the asset provider may require all the constraints are matched before the asset is delivered. In contrast, for an asset having thirty (30) constraints, the asset provider may require a match of a pre-established portion (e.g., 12) of the constraints. Further, it will be appreciated that some constraints may be necessary constraints (e.g., income over 50,000) while other constraints may be optional. The above described attribute strings or vectors describe one mechanism for matching asset constraints with household attributes and may be utilized with any of the systems disclosed herein. However, it will be noted that the systems disclosed herein are not limited to using the attribute strings or vector methodology for matching asset constraints and household attributes/characteristic.

Figure 3:
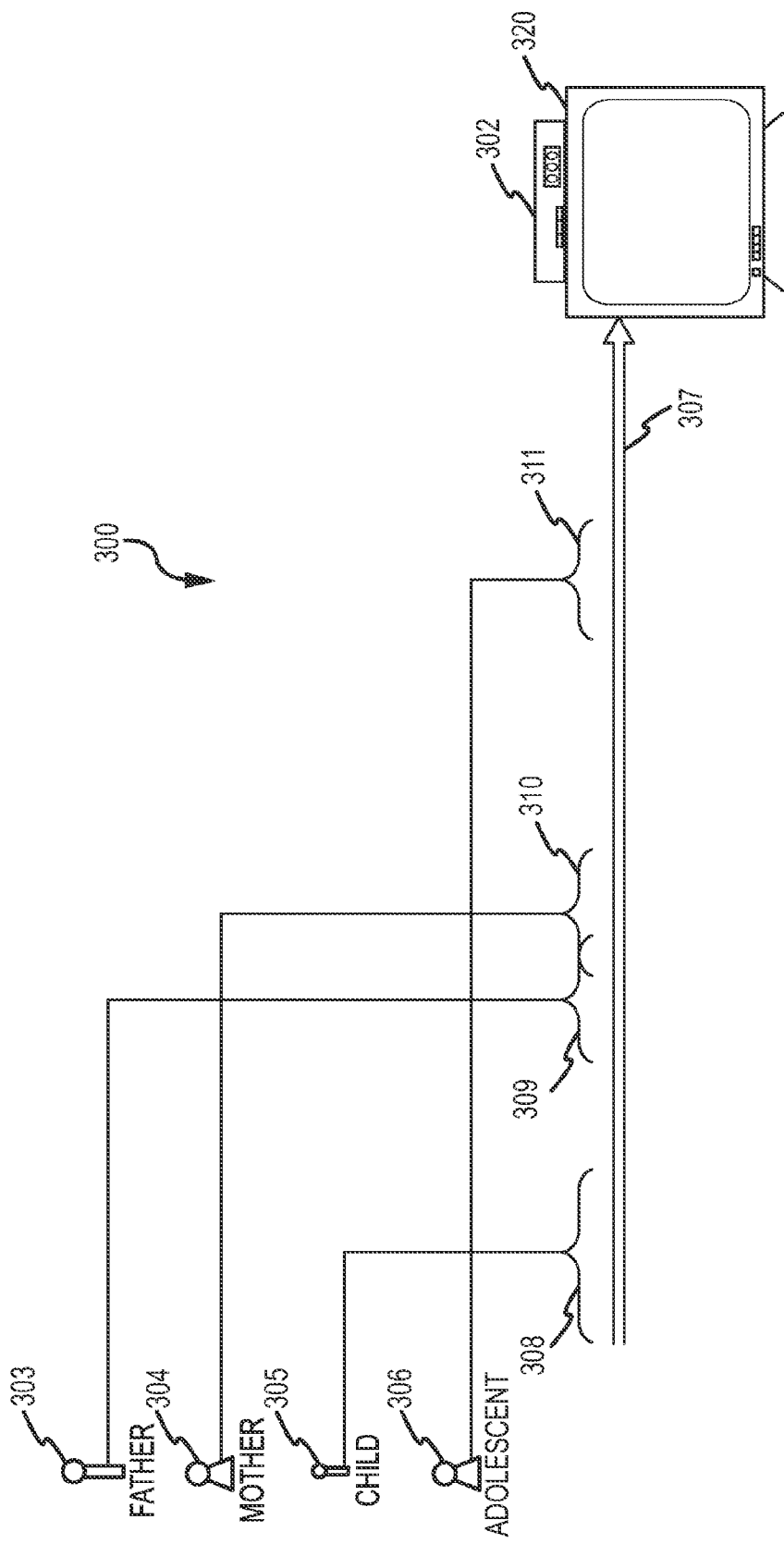
FIG. 3 illustrates network usage of a household.

While some previous asset targeting systems have purported to allow for delivering targeted assets to specified households, such systems have failed to provide a means to improve the likelihood of that, after delivery, the asset is output to the correct member of the household. In this regard, it is noted that a majority of households include demographically distinct members and that delivery of an asset to the wrong member the household may reduce or effectively eliminate the benefits of such targeted asset delivery. FIG. 3 illustrates a theoretical example of network usage of a household 300 including a television set 320 and an STB 312 that are associated with multiple demographically distinct users 303-306. Arrow 307 represents a timeline during which the television is utilized. A first user 305, in this case a young child, uses the television 320 during a first time period—for example, in the morning. Second and third users 303 and 304 (designated "father" and "mother") use the television during time periods 309 and 310, which may be, for example, in the afternoon or evening. An adolescent child 306 uses the television during a night time period in this example. This illustrates a number of challenges related to targeted asset delivery using household classification. First, because there are multiple users 303-306, targeting based on household demographics may have limited effectiveness. For example, it may be assumed that the young child 305 and father 303 in most cases would not be targeted by the same asset providers. For instance, in a cable-television context where a targeted advertisement for pool cleaning/maintenance services is provided to each household in the cable network having a pool, delivery of such an advertisement to a three-year-old child rather than the purchasing/decision-makers of the household (e.g., the household adults) results in a missed asset impression.

Accordingly, embodiments of the asset delivery systems disclosed herein obtain and/or utilizes additional information in order to make a determination as to which member or members of the household (e.g., current user or users) are putatively receiving output from a customer premise devise (e.g., STB). In this regard, an asset targeted to a specific member(s) of the household may be delivered with an improved confidence that the targeted member(s) actually receive the asset.

Figure 4:
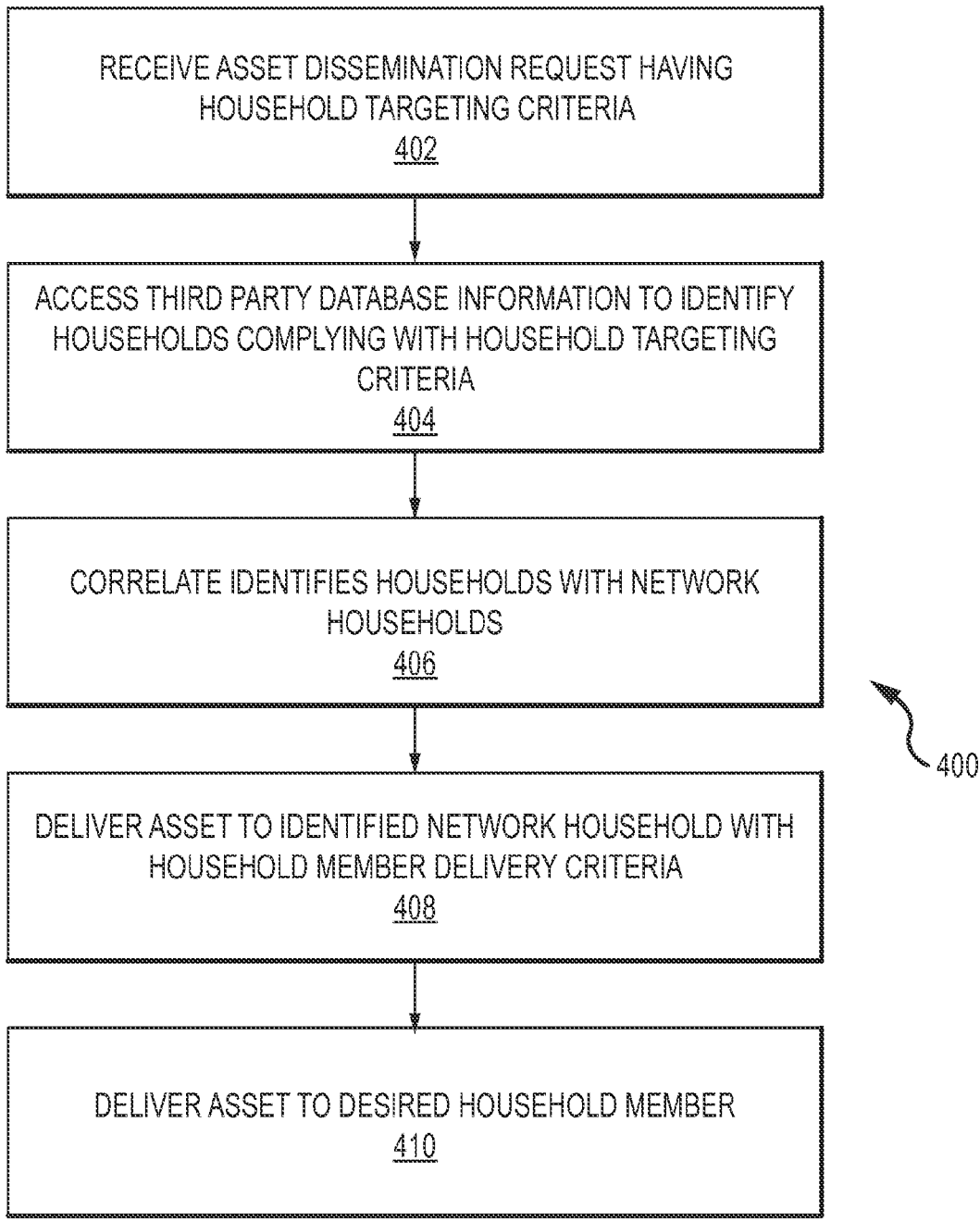
FIG. 4 illustrates one asset targeting process that may be implements by the system of FIG. 2.

FIG. 4 illustrates one process (400) for use in providing assets to specific households. Initially, an asset dissemination request is received (402) from an asset provider for a specified asset. The request includes one or more household targeting criteria/constraints. For instance, a car company could, for a given asset (e.g., minivan advertisement), specify that the asset is to be disseminated to households with greater than $35,000 income with at least one child in a specified geographic area. The request may also include one or more household member targeting criteria/constraints dictating which member(s) of the household is/are intended to receive the asset (e.g., household adults, over 35, gender of household adult, etc). That is, the asset provider may indicate which member(s) of a potentially multiple member household is/are the desired recipient(s) of the asset.

The ADS may then access (404) third party data to identify households matching the targeting constraints. It will be appreciated that the ADS may either directly access various third party databases (e.g., public databases) or provide a request to a data management company (e.g., private databases) who provides a list of households matching the targeting criteria. Alternatively, the ADS may include predetermined household attribute vectors that allow for identifying households that match the targeting criteria. Once the matching households are identified, they may be correlated (406) with network households. In this regard, the addresses of network households that match the targeting criteria may be identified and the asset may be delivered (408) to such network households. Once an indication is obtained that the desired/targeted household member is receiving network content, the asset may be delivered (410) to the desired household member.

Accordingly, information transmitted to an STB 118 of an identified network household (i.e., a household matching the targeting constraints/criteria for an asset) includes the target asset and information (e.g., metadata) identifying the targeted household member(s) for each such asset. It will be appreciated that the assets need not be transmitted in real-time. That is, assets may be forwarded to the STB 118 and stored in advance of an insertion spot where the asset may be delivered.

In the implementation illustrated in FIG. 2, the STB 118 has substantial resources available for storage, e.g., the STB 118 is a DVR box. In addition, it is assumed that the STB 118 has sufficient processing resources available to run an application for implementing certain targeted asset system functionality. In the illustrated embodiment, the STB 118 includes an asset delivery module 122 and storage 124 that can be used for storing asset options until delivery. The illustrated STB also includes an optional viewer monitoring module 123 that is operative to record network usage and report the same to the network. In the illustrated implementation, the STB 118 receives asset options addressed to the household (e.g., targeted to one or more members of the household) as well as metadata identifying the target individuals/household members for each of the assets. These assets and their metadata are stored in asset storage 124. The process of inserting these assets into network content being output to the members of the household is implemented by the asset delivery module 122.

The asset delivery module 122 is operative to identify an asset delivery opportunity and deliver an appropriate asset. In this regard, the asset delivery module 122 monitors the current programming channel being used by a current household member/network user, identifies an upcoming asset insertion spot for which targeted asset delivery is desired on that programming channel, identifies an appropriate asset for delivery, retrieves the asset from storage 124 and delivers the asset to users during the asset insertion spot. In this regard, metadata associated with received network content streams may identify the insertion spots for which assets can be delivered. If more than one asset is available for a given spot, appropriate logic may be executed to make a decision. For example, the asset to be delivered may be selected based on a lottery or rotating basis, or the highest value asset may be inserted.

In the implementation as illustrated in FIG. 2, inputs 140 from the current user of a multiple user STB may be analyzed by an algorithm/software supported by the STB to determine characteristics associated with the current user (e.g., in relation to other members of the household or statistical usage patterns). In other arrangements, actual viewing history and/or statistical information may be utilized to obtain an indication of characteristics of the current user of the STB. In any arrangement, upon identifying one or more such characteristics of the current user of the STB, an indication (e.g., a binary indication, percentage likelihood, etc.) may be generated as to the demographic classification or actual identity of the household member who is currently receiving network content. Likewise a determination may be made as to the presence or absence of a targeted household member(s) for a particular targeted asset. If the targeted household member(s) is/are considered present or the likelihood of such presence is greater than a predetermined threshold, the targeted asset may be delivered. Alternatively, if it is considered unlikely that the targeted household member(s) is/are present, the system may select a different targeted asset (e.g., directed towards another household member or a default asset for the household) or allow a network default asset to be delivered.

As shown in FIG. 2, the asset delivery module 122 has access to a click stream 140 from the network users of the household. Accordingly, the ad delivery module 122 can utilize various classification algorithms to determine characteristics of the current user in real-time, as described in U.S. patent application Ser. No. 11/743,540, entitled "System and Method to Perform Real-Time Audience Estimation and Commercial Selection Suitable for Targeted Advertising", and U.S. patent application Ser. No. 11/743,544, entitled "Fuzzy Logic Based Viewer Identification for Targeted Asset Delivery System", the contents of both which are incorporated by reference herein. These characteristics or classification parameters can be used to generate user presence indications to control asset selection and delivery. Further, access to third party data 104, customer database 106 and/or viewership monitoring information 108 for a specific household and/or an individual STB within the household may allow for improving the ability of the STB to determine who is currently utilizing the STB 118. For instance, if third party data and/or customer database information is available that allows the STB to know the composition of the members of the household (e.g., actual and/or putative), the asset delivery module 122 may utilize that information in conjunction with the click stream 140 or other inputs from the user to make an identification as to who is currently receiving output from the STB. In this regard, if information about the household membership composition is known, a simplified algorithm may be implemented by the asset delivery module 122 for determining the probable current user(s) of the STB.

Figure 5:
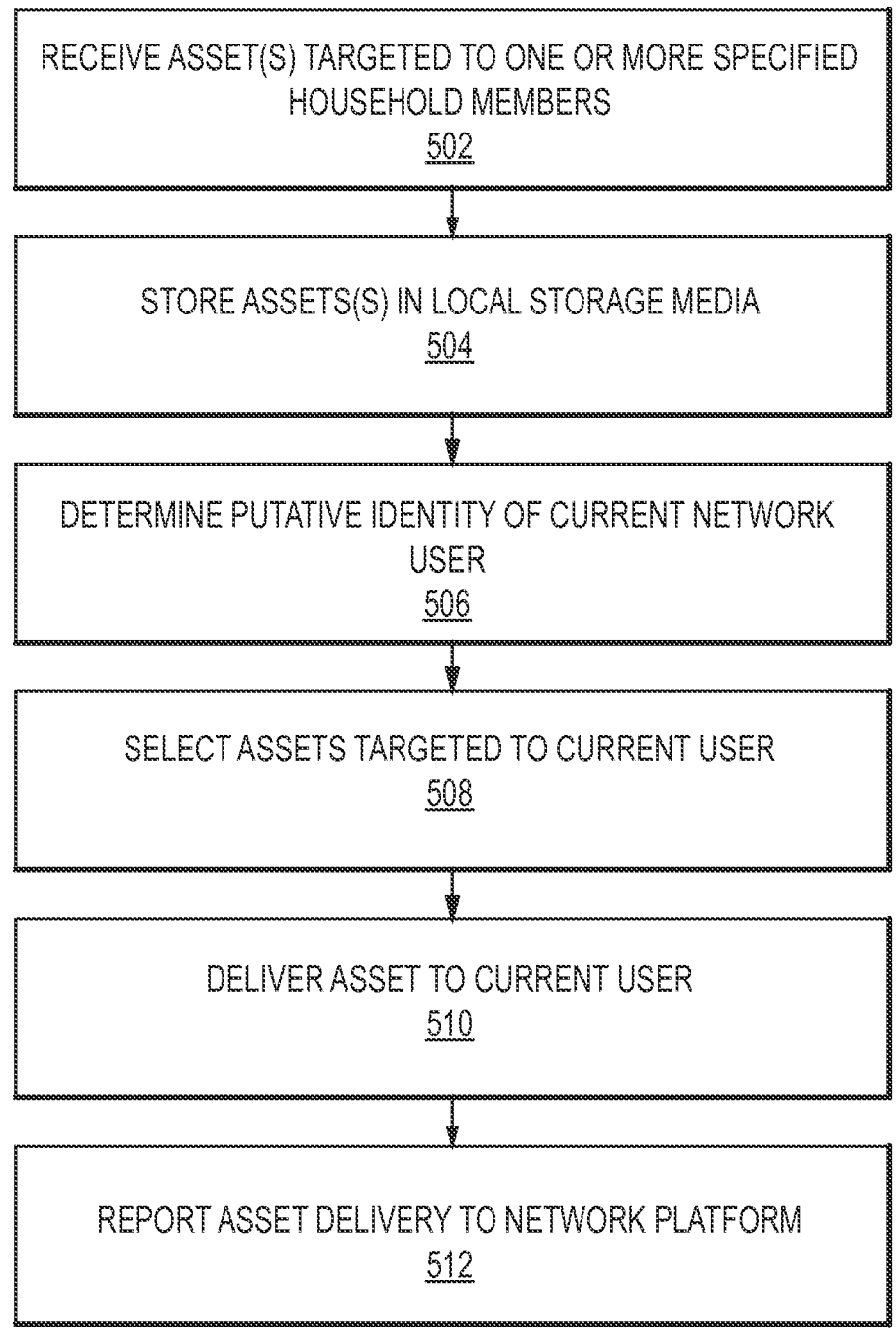
FIG. 5 illustrates one asset targeting process that may be implemented by an STB of a household.

FIG. 5 illustrates one process (500) for delivering targeted assets received and stored by a STB in conjunction with utilizing user inputs to identify which household member is the current user of the STB. Initially, one or more assets addressed to the household and targeted to one or more members of the household are received (502) at the STB via the network interface. These assets are stored 504 in local storage associated with the STB. Classification algorithms supported by the asset delivery module 122 are utilized to determine (506) a probable identification of the household member(s) currently utilizing the STB. Such algorithms may be self contained. That is, such classification algorithms may be operative to provide an indication of the demographic classification of a putative user(s) without any knowledge of the actual demographic make-up of the household.

In another arrangement, the asset delivery module may receive household information from the network for use with classification algorithms to determine which member(s) of the household is currently receiving network content from the STB. As discussed above, through use of various third party databases and/or customer databases, household membership composition may be known or inferred. That is, the actual or putative members of the household may be effectively determined. This information may be forwarded to the STB, which may then implement a member selection algorithm based on the user inputs to determine which of the known/inferred household members is currently using the STB. In either case, the asset delivery module of the STB receives an input (e.g., click stream 140) from the current network user. Based on this click stream and the classification algorithm(s), the asset delivery module of the STB may putatively determine (508) which member of the household is currently utilizing the STB. Once this determination is made, the STB may select (508) assets stored within the ad storage 124 that are targeted to the current network user or users and deliver (510) the asset to the user(s). Further, once the asset is delivered to the current user(s) who is believed to be the targeted individual for that asset, the STB may report (512) the delivery of the asset to the network.

It will be appreciated that the ability to match third-party data to network households to identify appropriate households for asset delivery and the ability to deliver the asset to particular household members may allow for increasing the effectiveness of asset targeting. Further, the ability to deliver assets to specific members of a household may allow for targeting demographic groups that were previously not large enough to receive broadcast assets in a cost effective manner. That is, the ability to deliver assets to specific household members allows for providing assets to a small set of individuals sharing one or more specified traits. This may allow for broadcast targeting of assets that previously were limited to other forms of advertising (e.g., trade publications and/or seminars). By way of example only, it is noted that medical products (e.g., heart valves, stints, etc.) are often marketed to medical professionals such as physician/surgeons who specialize in particular medical field (e.g., cardiology). As the overall number of such medical professionals in the particular medical field is generally small, broadcast advertising has been an ineffective method to deliver such product information. Accordingly, other advertising media (e.g., trade journals, sales representatives, etc.) have been utilized to deliver such product information. That is, broadcast dissemination of assets to small or specialized groups has previously been cost prohibitive, especially when there is no guarantee that a targeted individual is present to receive such assets when output. However, the ability to utilize third-party database information to identify households including such specialized individuals, the ability to deliver information/assets to those households and the ability to putatively determine when the targeted individual is receiving network content allows asset providers to deliver assets to specialized groups that were previously considered too small to receive broadcast assets.

Figure 6:
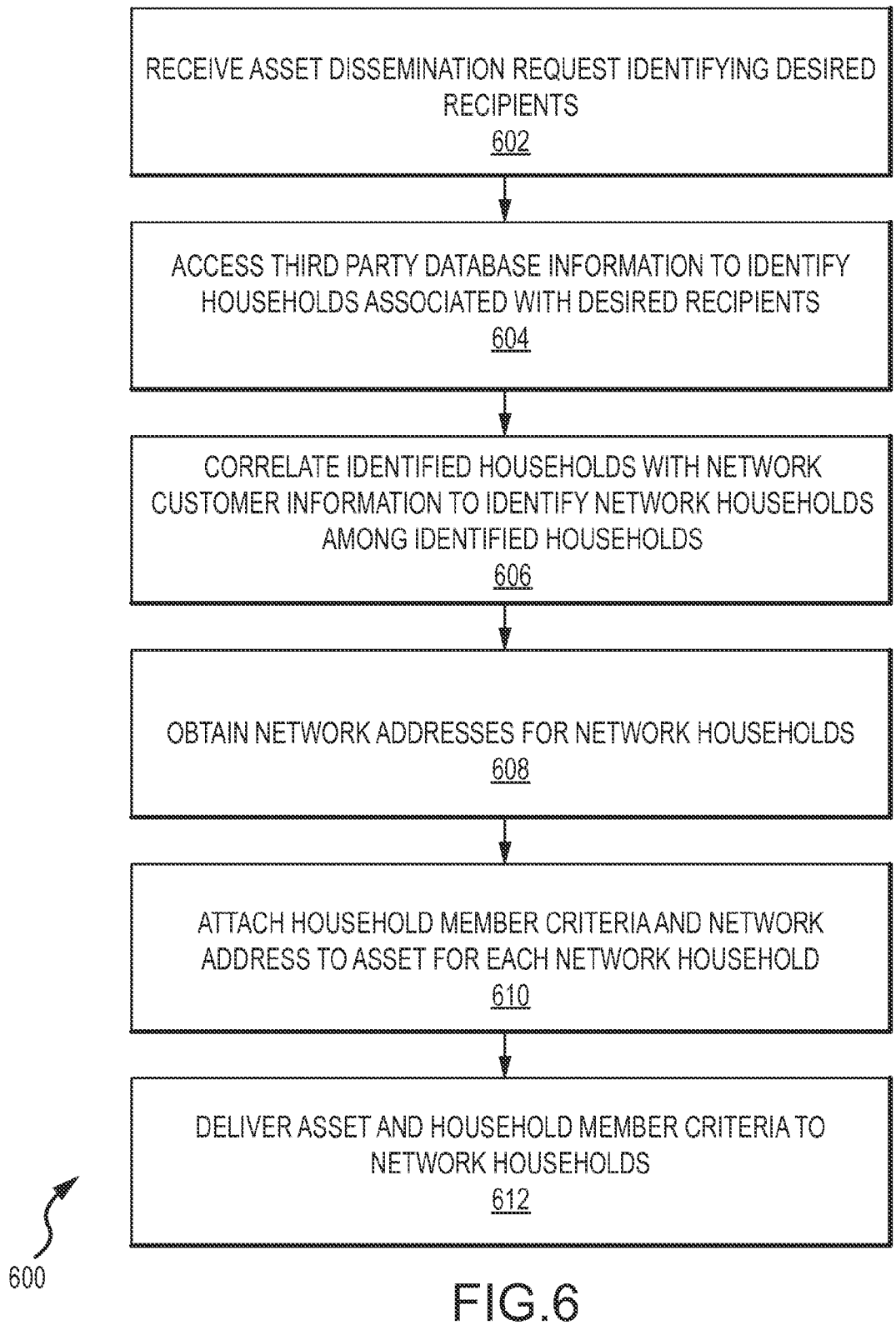
FIG. 6 illustrates an asset targeting process that allows asset providers to provide specific information regarding desired recipients.

FIG. 6 illustrates a process (600) for use with the ADS system where asset providers are allowed to provide assets to a specified group of recipients. In this regard, an asset provider may provide a list of identified recipients (e.g., names, addresses or other identifying information) to which they would like to deliver one or more assets. As will be appreciated, such a process may be used to deliver high-value assets (e.g., light jet advertisements) to a group of recipients identified by an asset provider as likely consumers for such high-value assets. However, it will be appreciated that the process may be utilized for more generalized targeted asset delivery where an asset provider intends to, for example, provide assets to previous customers.

Initially, an asset dissemination request is received (602) that includes recipient information identifying a plurality of desired asset recipients. The asset dissemination request also includes an asset for dissemination to those identified recipients. Third-party database information is accessed to identify (604) households associated with the desired asset recipients. The third-party database information may also be accessed to identify one or more demographic characteristics of the desired recipient within the household. For instance, if an asset provider intends to provide assets to medical doctors (e.g., desired recipients) within a geographic region, the ages and gender of these medical doctors will vary between households. Accordingly, if all or a portion of this demographic information is not known to the asset provider, third-party database information may be utilized to obtain such information for use in generating a household member constraints/criteria. Further, such constraints may be utilized to deliver the asset to the correct member of the targeted household. Alternatively, the asset provider may provide demographic information that allows for effectuating delivery of the asset to the correct household member. In any case, the identified households are correlated (606) with network customer information to identify which of the identified households are served by the network (e.g., are network households). The network addresses are obtained (608) for each network household. Accordingly, household member constraints may be attached (610) to the asset with the network address and the asset may be delivered (612) to each of the network households. Accordingly, user equipment devices (e.g., STBs) that receive assets may output the same when there is an indication that the targeted individual of the household is present. Further, such user equipment devices may report the same back to the ADS system.

Figure 7:
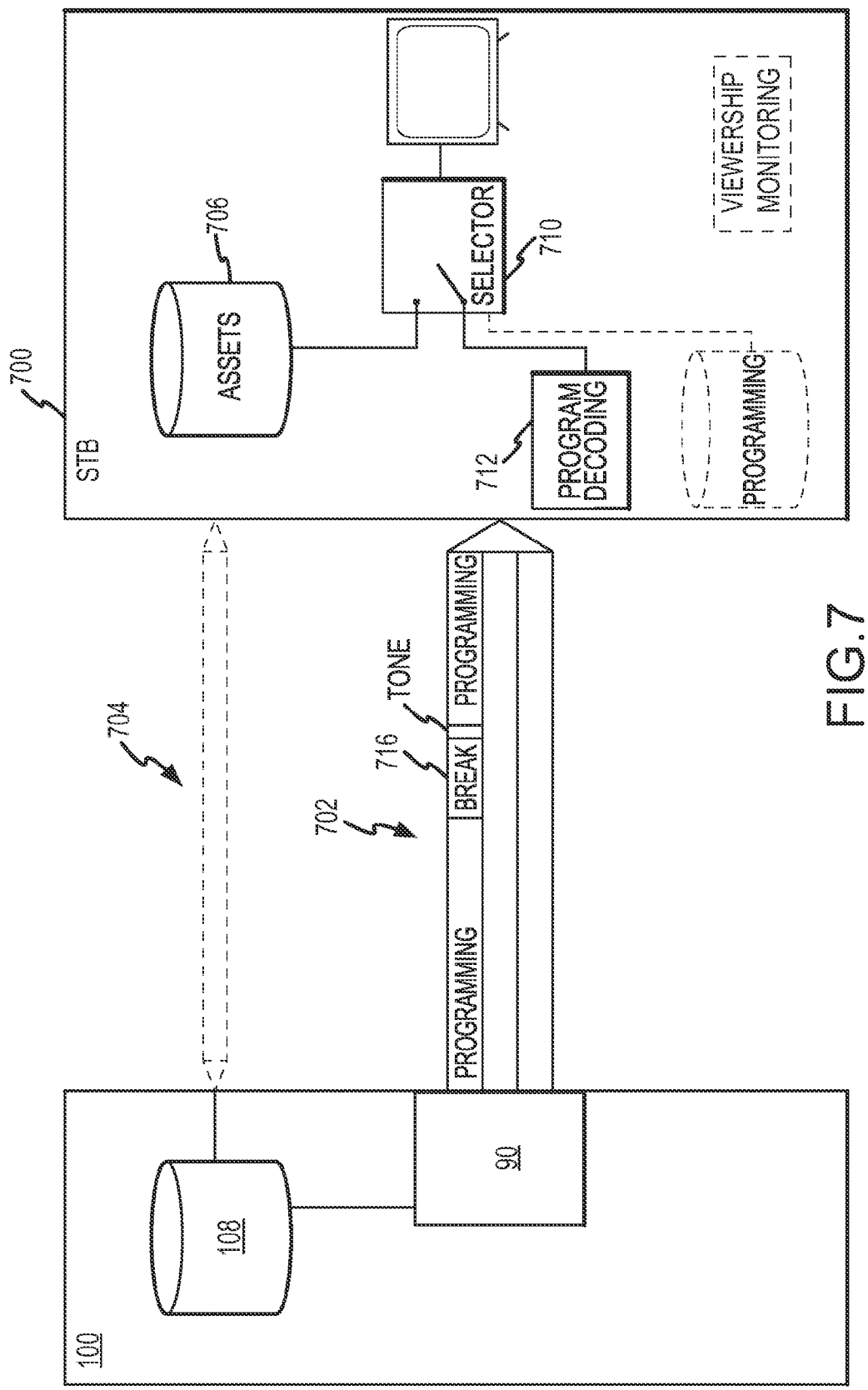
FIG. 7 illustrates a forward-and-store implementation of a household member targeted asset delivery system.

Asset targeting based on the current user or users of a STB can be implemented using a variety of architectures in accordance with the present invention. Various implementations discussed above involve a forward-and-store functionality. In a forward and store implementation shown in FIG. 7, a STB 700 may receive assets for local storage 706 that are targeted for delivery to specific members of the household prior to receiving a content stream 702 into which the assets are inserted. Such assets may be received via the network interface or via a separate communications interface 704. Such a separate communications interface may also be utilized to provide information to the network (e.g., asset delivery reports, network usage information etc.). In such a forward-and-store implementation, the STB 700 selectively replaces a default advertisement within a content/programming stream 702 received by the STB. As shown in FIG. 7, an STB of a household 700 receives a programming stream 702 from a network platform 90. Such a programming stream may be received from any appropriate network platform (e.g., repeater station, satellite, headend, etc.).

In the illustrated implementation, the content stream 702 is provided to the STB where programming is provided with an interleaved programming break 716 including at least a first asset delivery spot. This programming break 716 is proceeded by an insertion signal or tone. The STB may include a decoding device 712 that allows for monitoring a received content shown to identify an insertion signal and thereby identifying the time and duration of an upcoming break 716. In addition, the STB may also identify metadata and/or SCTE signals within the content stream 702. Such signals may identify the targeted audience parameters for the default asset included within the programming break 716. Accordingly, the STB may utilize this information in conjunction with household member targeting criteria of stored assets as well as an indication of which household member is currently receiving content to determine whether the default asset included within the programming break 716 is suitable for delivery to the current user of the STB or if an alternate asset(s) would be more appropriate. In instances where it is determined that a different asset may be more appropriate based on the current user, the STB may utilize a selector 710 switch between the content stream 702 and an asset input stream interconnected to the asset database 706 such that a default asset within the content stream 702 may be replaced with a stored asset targeted to the current user.

Figure 8:
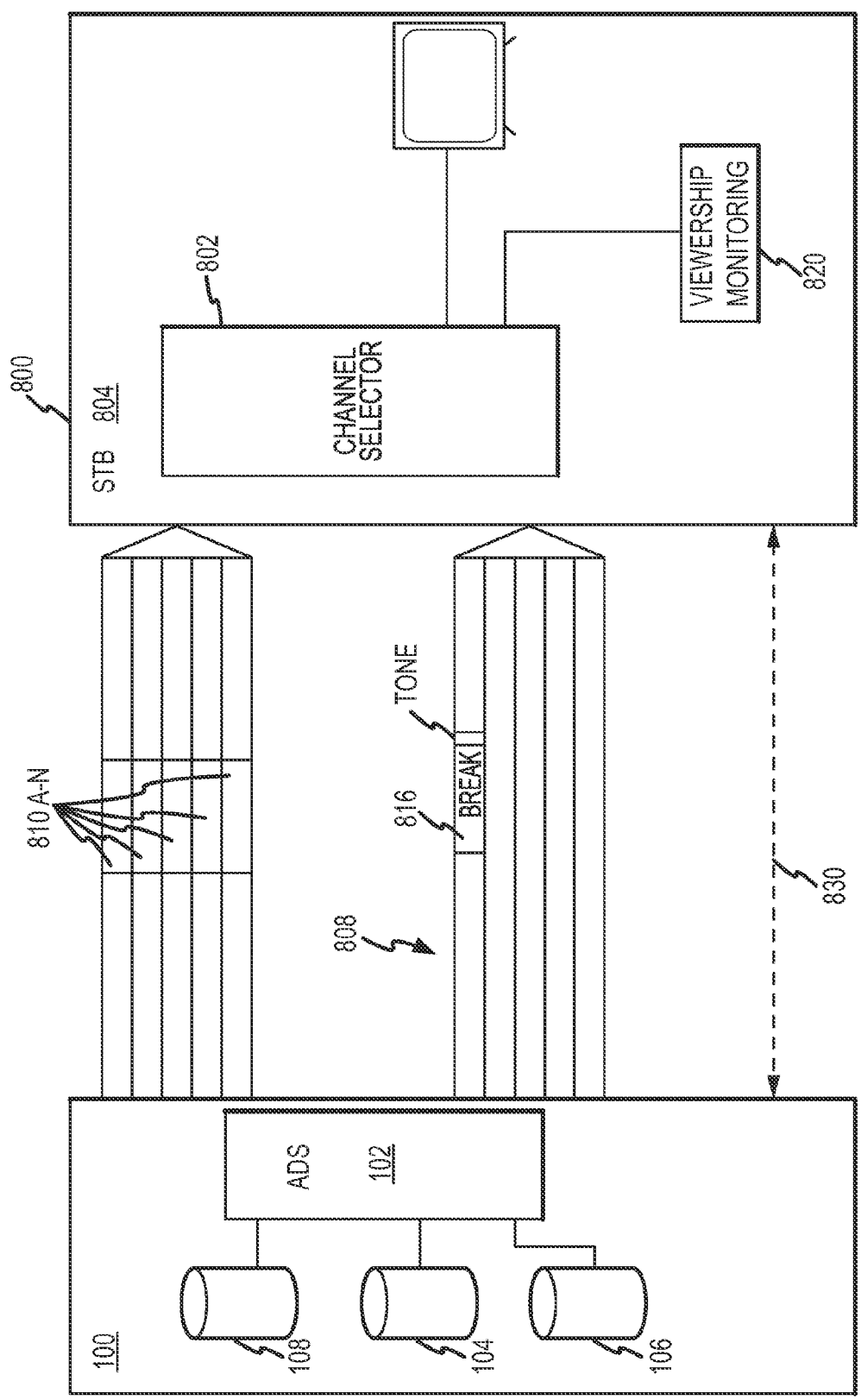
FIG. 8 illustrates a channel hopping implementation of a household member targeted asset delivery system.

In another embodiment illustrated in FIG. 8, targeted assets may be transmitted to network users of a specified household in synchrony with a given break in a content stream. In this embodiment, rather than utilizing a forward-and-store architecture, a dynamic insertion system is utilized to insert assets into a content stream 808 for delivery to a specific household 800. As shown, the STB 804 of the household 800 may include a selector 802, which is operative to switch to an asset stream associated with a targeted asset at the beginning of a break 816 and return to a programming content stream at the end of the break. That is, the selector 802 may hop between content streams/transmission bands during a break to deliver a targeted asset to an identified network user. Again, the ADS system 102 may utilize third party database information 104 in order to identify network households and members of the network household for receipt of a targeted asset.

In one embodiment, the STB 804 may include a viewer monitoring module 820 that, similar to the asset delivery module discussed in relation to FIG. 2, is operative to identify input from a network user in order to provide a putative identification of the current network user or users. Furthermore, the viewer monitoring module 820 may be operative to send this information to the ADS system 102 within the broadcast network 100. Such reporting may be done via the network interface or via a separate communications link 830. Alternatively, the viewer monitoring module 820 may be operative to report current user identification upon determining a change in the current putative user/household member. In a further embodiment, the viewer monitoring module may simply pass along inputs from the current user(s) to the ADS 102. In this regard, algorithms for determining a current user(s) may be stored by the ADS 102 and/or utilized with viewer history information associated with the STB stored by the network. Upon receiving an indication of the putative identity of a current network user in addition to the identification of that network user (e.g., MAC address of the STB 804), the ADS 102 is operative to access assets from storage that are targeted to that particular user of the STB 804.

In this implementation, a targeted asset may be inserted into a parallel transmission band 810 to the content stream 808 currently being output to the user of the STB. In one such arrangement, the parallel content band 710 is a single content band that is dedicated to the household 800 of the STB 804. In another arrangement, a plurality of parallel content bands are available to provide targeted assets to multiple different households. When a specific household member is identified as being present and the ADS 102 identifies an asset targeted to that household member, the asset may be inserted into a content stream 810A-N and delivered to the STB. A signal may be provided to the STB of the targeted household 800 such that the STB 804 knows which parallel transmission band to switch to during the asset insertion spot/break. For instance, the STB may receive information with the content stream (e.g., metadata SCTE signals, etc.) that provide an indication of the location of the upcoming targeted asset. Accordingly, the channel selector 802 of the STB 804 may switch between transmission channels at the beginning of the break (e.g., signaled by the tone), present the asset in the parallel transmission band to the user and then switch back to the original content stream at the end of the insertion spot. That is, the STB may switch back to the primary transmission band such that the household switches back to the programming they were originally receiving.

In a further implementation where assets are delivered in synchrony with a given break in a content stream, the ADS 102 utilizes viewer information 108 accessible via the network in order to provide an indication that a targeted member(s) of a specific household is receiving content. In such an arrangement, assets may again be selected for a household and/or specific members of a household based on third party data 104. However, instead of receiving an indication from the STB of the putative identity of the current user(s), viewer information 108 is utilized. Viewer information may be based on statistically gathered information that may be received from media research entities such as, for example, Nielsen ratings. In such an arrangement, third party database 104 and/or customer databases 106 may be utilized to identify compositions of the household. In addition, viewer information database 108 may be utilized to provide an indication of which household member(s) is most likely receiving content. For instance, if a targeted household is receiving network content on a Saturday afternoon (e.g., college football) and viewer information indicates that 70% of the audience for the programming are represented by a particular demographics (e.g., adult males), this viewer information may be utilized with putative and/or actual information relating to the composition of the household. Accordingly, if targeted assets are available for the adult male of the household during a time period when network content consumption is associated with adult male viewing, an asset for that household member may be addressed and delivered at that time with an enhanced likelihood of being delivered to the correct household member.

In a further arrangement, the viewer information 108 may include actual viewer information from a specific household. In this regard, the STB of the household may periodically report viewer information including channels viewed and/or the times those channels were viewed. Accordingly, this information may be utilized to generate a profile of expected usage times for members of the household. In this regard, such a profile may be utilized in conjunction with providing assets targeted to specific members of the household.

The ability to correlate third party data to network households may also be utilized to provide feedback to asset providers regarding demographic information of households and/or individuals that consume (e.g., view) assets of the asset providers. That is, in a broadcast network 100 where at least a portion of the network households 150 within the network are operative to report the identity of the assets the household consumes, it is possible to identify demographic information associated with those households. One system that allows for reporting the identity of consumed assets is set forth in co-pending U.S. patent application Ser. No. 11/332,773, entitled "Monitoring a Broadcast Network," having a filing date of Jan. 12, 2006, the entire contents of which are incorporated herein by reference.

Figure 9:
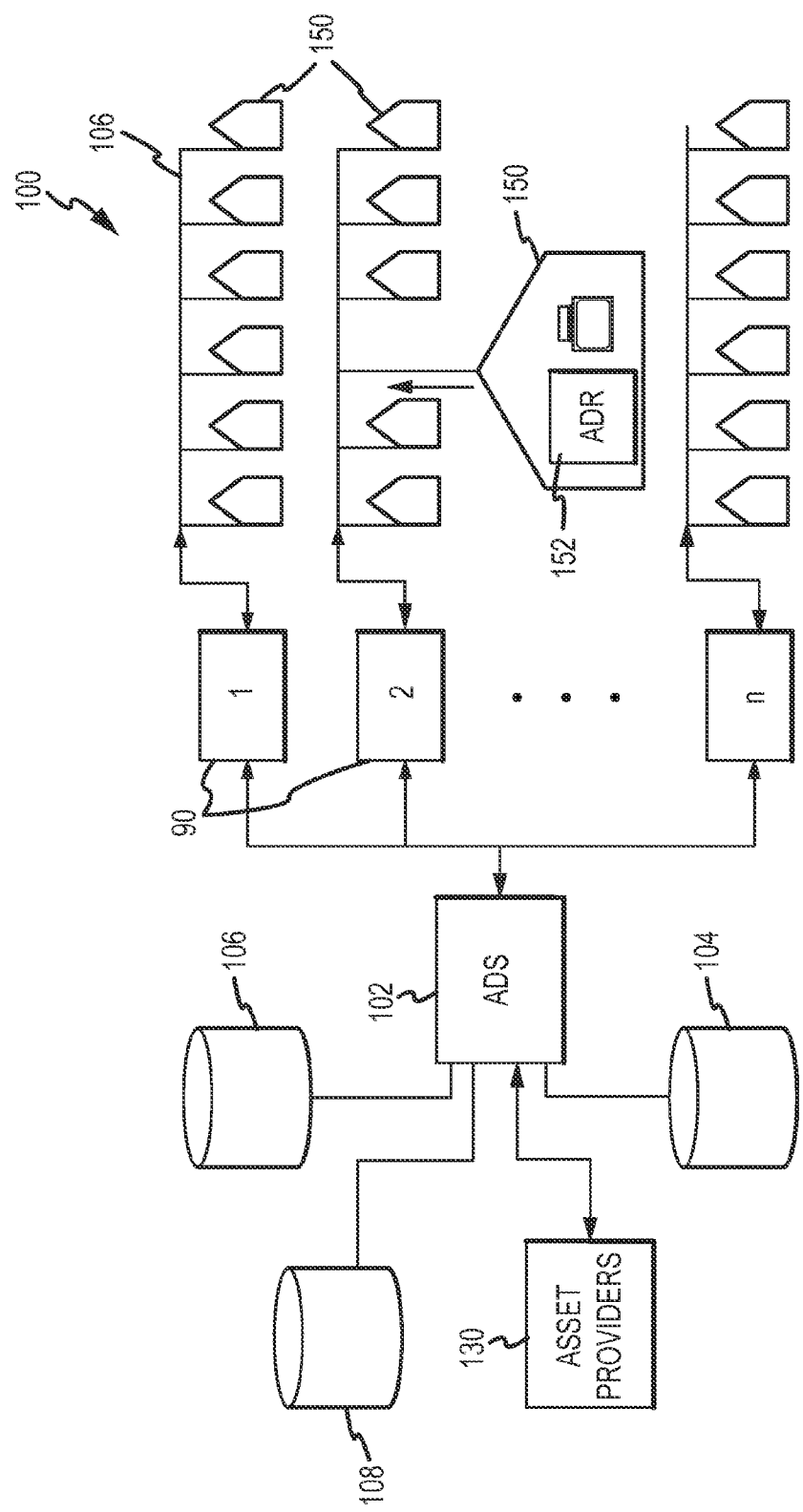
FIG. 9 illustrates an asset provider feedback system.
Figure 10:
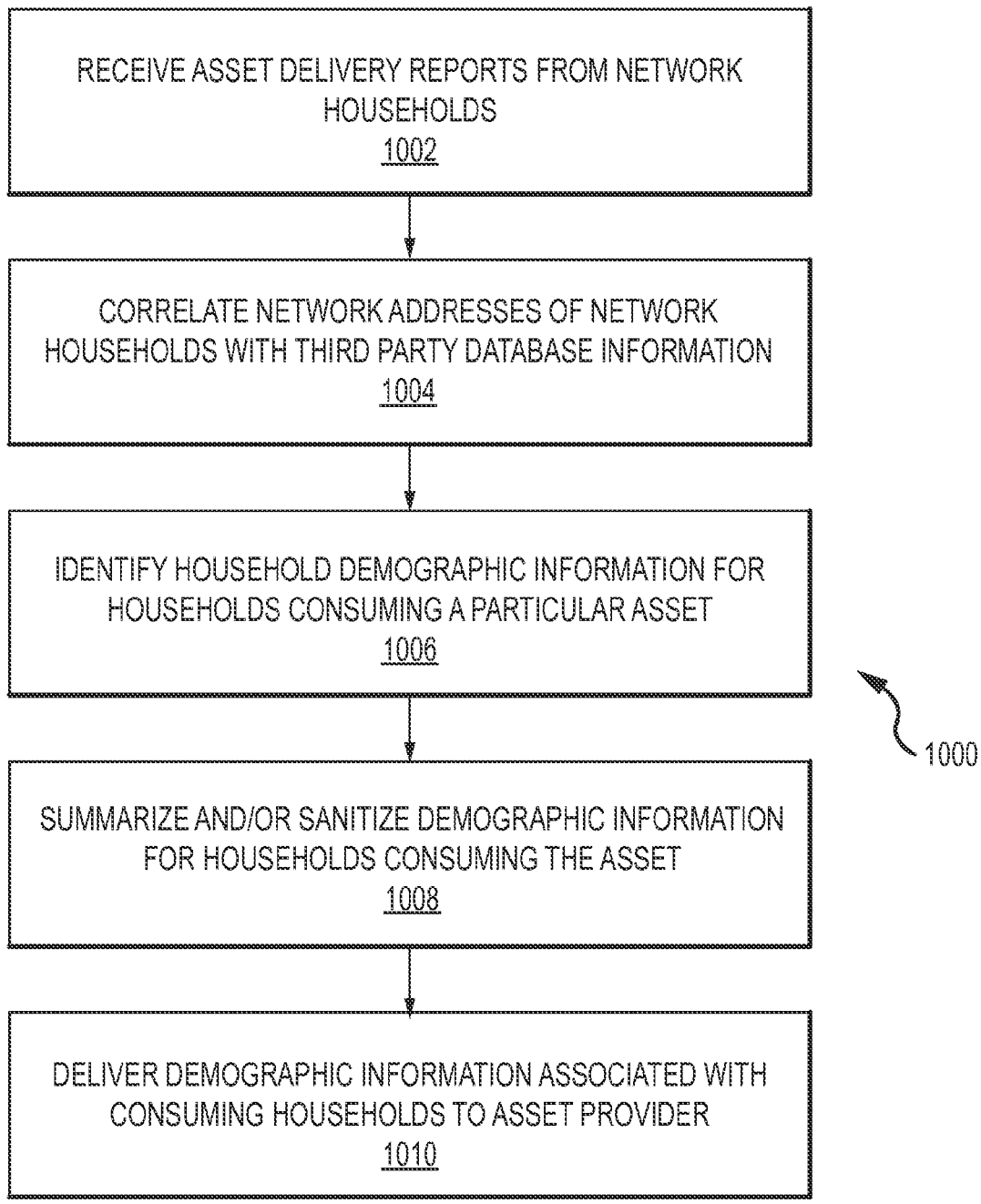
FIG. 10 illustrates a process for use with an asset provider feedback system.

FIGS. 9 and 10 illustrates a system and process (1000) where at least a portion of the households 150 within the network 100 are operative to report to a platform 102 within the broadcast network (e.g., ADS system 102) the identity of assets that are output to users of customer premise equipment (e.g., STB's) of those households. The ADS 102 is operative to receive these asset delivery reports from reporting modules 152 some or all of the network households 150 and determine the network addresses associated with each reporting household. As will be appreciated, the network addresses of the reporting network households may, in one embodiment, be reported with the asset delivery reports. Such asset delivery reports may be received directly from network households or from one or more network platforms 90 (e.g., head ends, etc.) servicing such network households. Once the asset delivery reports and network addresses are obtained (1002), the ADS system is operative to correlate (1004) those network addresses to third party data 104 to identify demographic information of the consuming households. As will be appreciated, such correlation (1004) may require accessing customer databases 106 in order to determine customer information associated with the network addresses. Such customer information (e.g., names, addresses, etc) may then be correlated to third party database information.

In any case, information about the network households that consume a particular asset may be identified (1006). Furthermore, the information regarding households consuming a given asset (e.g., consumption data) may be summarized (1008) prior to presentation to asset providers 130. In this regard, it will be appreciated that such third party data may be divided into various demographic categories. That is, upon request by asset providers, the ADS may determine various specified demographic characteristics of the households that consumed a particular asset. Such demographic information may include, without limitation, household income, geographic location, household size, ethnicity, geodemographic cluster from some model, "wealth," net worth, presence of children under 12, etc. In any case, consumption data may be provided (1010) to an asset provider who may then utilize such information for future asset production and/or asset targeting.

It will be appreciated that in order to preserve network customer confidentiality, the identity of individual households who consume the asset may not be provided to asset providers. However, in a further arrangement where individual households are enabled to opt in (e.g., provide consent), the identification of individual households may be provided to asset providers. In this regard, asset providers may be able to deliver additional assets to the identified households, and the members of the identified households may receive assets that are of interest to the household.

In a related arrangement, asset delivery information may be used to anti-correlate demographics to assets that are actively rejected by network viewers. In such an arrangement, ADNs may be extended to include information about "active tune aways" wherein a network viewer views only a fraction of the start of an asset and then changes channels. The ADN may contain the fraction of the asset that was viewed, and whenever that fraction falls below a certain threshold that asset can be considered to be rejected. The third party database information may be accessed to provide a demographics for network users who receive, but reject, the asset. Accordingly, for a given asset a plurality of ADNs may be matched to a plurality of different network households to provide a general profile of network users that reject the asset. In the same way that asset consumption reports, described in the antecedent paragraph are provided to network users, asset rejection reports may be provided. These rejection reports may prove invaluable to asset providers. As an example, suppose that an asset provider has targeted a specific asset at men between the ages of 18 and 54. A report that men between the ages of 35 and 54 routine consume the assets but men between the ages of 18 and 34 actively reject the assets could lead to the development of an asset that better appeals to the 18 to 34 age range.

The ability to utilize anti-correlation information may be extended to the consumers themselves. For instance, as illustrated in FIG. 2, households may be provided access to a consumer interface 142. At such an interface, a household member/user may, for instance, use the graphical user interface 142 to specify positive or negative criteria that may be used in providing assets to the household associated with the consumer. The provision of negative constraints may be especially important as consumers who specifically note they are not interested in receiving certain classes of assets are likely to tune away form such assets when presented. Accordingly, rather than provide an undesired asset that will likely result in a tune away, the asset insertion opportunity is better served by providing another asset that is deemed acceptable by the consumer. That is, even if third party data would otherwise indicate that and a particular individual/consumer is a good fit for an asset, if the consumer has indicated that they do not want to receive such assets the provision of such an asset provides no value to the consumer or the asset providers. Accordingly, the household attributes and/or resulting attribute vectors may include consumer provided preferences and dislikes.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The invention claimed is:

1. A method for use in connection with delivering selected content to users of a broadcast network, the broadcast network primarily involving synchronized distribution of broadcast content to multiple users, the method comprising the steps of:

1) obtaining, at a network platform, asset dissemination information for an asset, wherein said asset dissemination information includes a list of identified individuals for receipt of said assets, by:

a) accessing a third party demographic information repository having demographic information for members of the public including subscribers of said broadcast network and nonsubscribers of said broadcast network, to obtain household information identifying households associated with at least one of said identified individuals for said asset; and b) accessing network customer information for the broadcast network to identify network households including at least one of said identified individuals for receipt of said asset, and wherein combined information from a combination of said third party demographic information and said network customer information identifies at least one ambiguous multi-member network household, said ambiguous multi-member network household being a subscriber household of said broadcast network and including a first member, who is one of said identified individuals of said list, and a second member who is not one of said identified individuals of said list, said combined information further indicating a demographic distinction as between said first and second members of said ambiguous multimember network household; and 2) controlling delivery, via a network interface, of said asset to said first member at said ambiguous multimember network household based on said demographic distinction, said asset being delivered at said network household upon inferring a putative presence of said first member based on a use of the broadcast network.

2. The method of claim 1, further comprising:
obtaining network addresses for said network households; and
delivering said asset to said network addresses.

3. The method of claim 1, further comprising:
obtaining at least one demographic characteristic for each of a plurality of individuals associated with said household.

4. The method of claim 3, wherein said at least one demographic characteristic is obtained from said third party demographic information repository.

5. The method of claim 1, wherein the list of identified individuals comprises, for each individual on the list, at least one of:
a name; and
an address.

6. A method for use in connection with delivering selected content to users of a broadcast network, the broadcast network primarily involving synchronized distribution of broadcast content to multiple users, the method comprising the steps of:
receiving an asset dissemination request for an asset, wherein said asset dissemination request includes recipient information identifying a group of desired asset recipients, wherein each individual member of said group is identifiable;
providing information identifying at least some of said group of desired asset recipients to a third-party demographic information repository having demographic information for members of the public including subscribers of said broadcast network and nonsubscribers;
obtaining, from said third party demographic information repository, household information identifying households associated with said individual members of said group of desired asset recipients, said household information including multimember household information concerning households with more than one member;
obtaining, from said third party demographic information repository, at least a first demographic classification for individual members of said group of desired asset recipients;
identifying households associated with said group of desired asset recipients that are network households serviced by said broadcast network;
controlling delivery of said asset via equipment of at least a portion of said network households, wherein each of said portion of network households receives said asset and further receives information correlated to an individual member of said group associated with said household.

7. The method of claim 6, wherein said desired asset recipients comprises a list of identified individuals.

8. The method of claim 6, wherein said desired asset recipients comprises identification of a specified group, wherein members of said group are identified using said third-party demographic information repository.

9. The method of claim 6, further comprising receiving a notification from said network household that said asset was delivered.

10. The method of claim 9, further comprising:
delivering a notification to an asset provider that provided said asset indicating the asset was delivered.

11. The method of claim 6, wherein said asset is inserted in a content stream for real-time delivery to at least one of said network households.

12. The method of claim 6, wherein said asset is delivered to a user equipment device of at least a portion of said network households for subsequent delivery.

13. The method of claim 6, wherein said each individual member is identified by at least one of:
a name; and
an address.

14. A method for use in connection with delivering selected content to users of a broadcast network, the broadcast network primarily involving synchronized distribution of broadcast content to multiple users, the method comprising the steps of:
a) receiving, at a network platform, an asset dissemination request for an asset, wherein said asset dissemination request includes targeting information identifying a target audience for said asset;
b) constructing a list of recipients for said asset in connection with one or more asset delivery opportunities of said broadcast network by:
1) obtaining said targeting information for said asset;
2) accessing a network repository of network customer information regarding customers of the broadcast network, wherein said customers may be identified as individuals or households and said customers include at least one multi-member household;
3) accessing a third party data repository including classification information for members of the public including at least some of said customers of the broadcast network and at least some households or individuals other than said customers, said third party data repository including information specific to different members of said multi-member household; and
4) inferring specific user information based on a use of the broadcast network, for said multi-member household, indicating that at least a specific user of said multi-member household is likely to be available for receiving said asset in connection with one of said asset delivery opportunities; and
c) using said list of recipients to control delivery of said asset in connection with said one of said asset delivery opportunities.

* * * * *